(12) United States Patent
Kim et al.

(10) Patent No.: US 12,353,332 B2
(45) Date of Patent: Jul. 8, 2025

(54) STORAGE DEVICE SUPPORTING MULTI-NAMESPACE AND METHOD OF OPERATING THE SAME

(71) Applicant: Samsung Electronics Co., Ltd., Suwon-si (KR)

(72) Inventors: Sungjin Kim, Suwon-si (KR); Jea-Young Kwon, Suwon-si (KR); Jaesub Kim, Suwon-si (KR); Hongmoon Wang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/531,155

(22) Filed: Dec. 6, 2023

(65) Prior Publication Data

US 2024/0241835 A1    Jul. 18, 2024

(30) Foreign Application Priority Data

Jan. 16, 2023    (KR) .................. 10-2023-0006344

(51) Int. Cl.
G06F 12/00       (2006.01)
G06F 12/1027     (2016.01)

(52) U.S. Cl.
CPC ............... *G06F 12/1027* (2013.01)

(58) Field of Classification Search
CPC ......... G06F 12/1027; G06F 2212/7201; G06F 2212/7205; G06F 12/0246; G06F 3/0611; G06F 3/0614; G06F 3/064; G06F 3/0652; G06F 3/0656; G06F 3/0658; G06F 3/0679; G06F 12/0873; G06F 12/1009; G06F 12/0292; G06F 12/0891
See application file for complete search history.

(56) References Cited

U.S. PATENT DOCUMENTS

| | | |
|---|---|---|
| 10,275,361 B2 | 4/2019 | Ish et al. |
| 10,324,834 B2 | 6/2019 | Seo et al. |
| 10,437,476 B2 | 10/2019 | Frolikov |
| 11,288,180 B2 | 3/2022 | Frolikov |
| 2017/0220253 A1 | 8/2017 | Kohara et al. |

(Continued)

FOREIGN PATENT DOCUMENTS

KR    10-2018-0047402 A    5/2018

OTHER PUBLICATIONS

Extended European Search Report dated Jun. 10, 2024 for corresponding European Application No. 23220502.1.

*Primary Examiner* — John A Lane
(74) *Attorney, Agent, or Firm* — Harness, Dickey & Pierce, P.L.C.

(57) ABSTRACT

A storage device includes a nonvolatile memory and a controller configured to manage data, stored in the nonvolatile memory, through a plurality of namespaces. The plurality of namespaces may include a first namespace, allocated to a first logical address space, and a second namespace allocated to a second logical address space, contiguous to the first logical address space. The controller may be configured to delete the first namespace in the first logical address space in response to a request of deleting the first name space, to copy the mapping information on the second namespace from the second logical address space to the first logical address space, and to load the mapping information on the second namespace into a cache.

20 Claims, 22 Drawing Sheets

(56) References Cited

U.S. PATENT DOCUMENTS

| | | |
|---|---|---|
| 2018/0121344 A1* | 5/2018 | Seo ..................... G06F 12/0246 |
| 2018/0239697 A1 | 8/2018 | Huang et al. |
| 2019/0114112 A1 | 4/2019 | Lin |
| 2020/0089421 A1 | 3/2020 | Oh |
| 2020/0089619 A1* | 3/2020 | Hsu ....................... G06F 3/0604 |
| 2022/0197818 A1* | 6/2022 | Lin ....................... G06F 12/109 |

\* cited by examiner

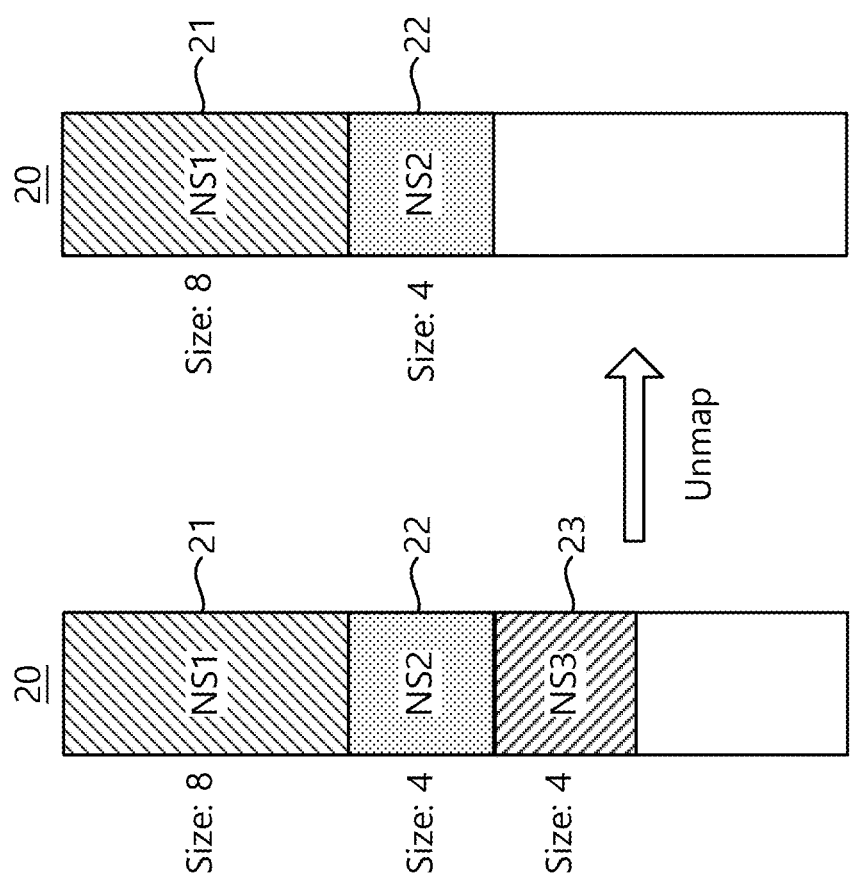

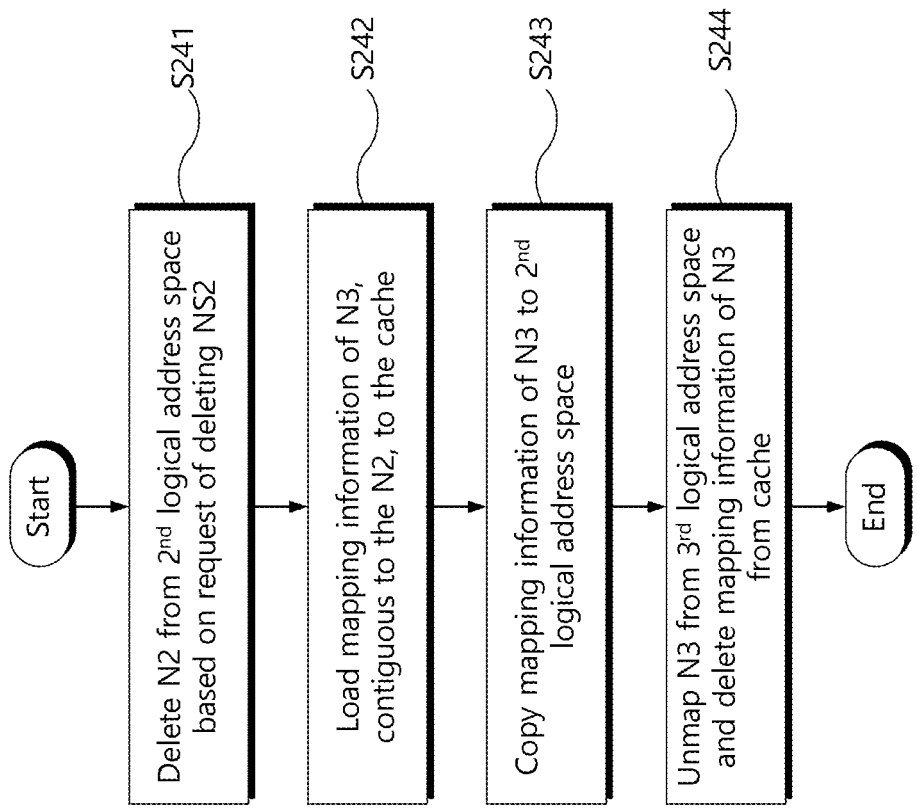

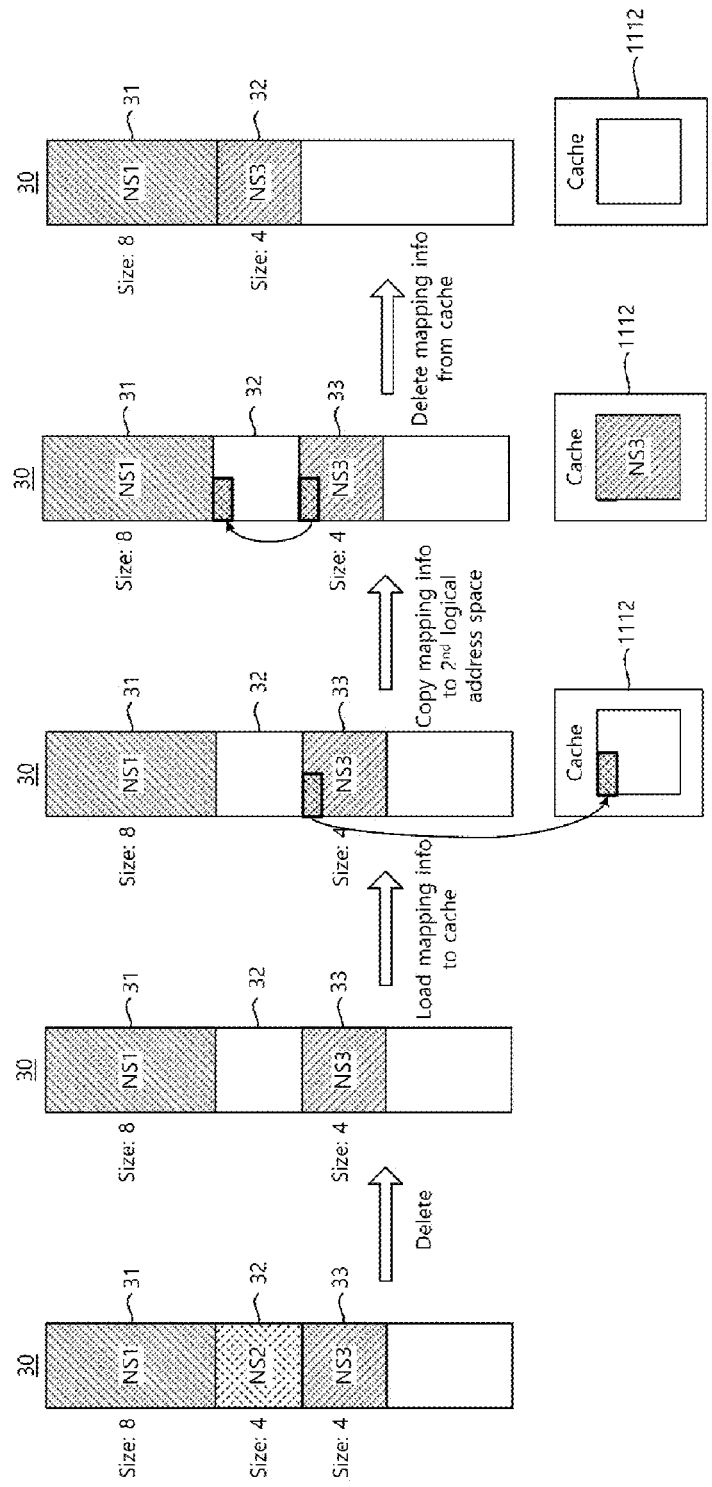

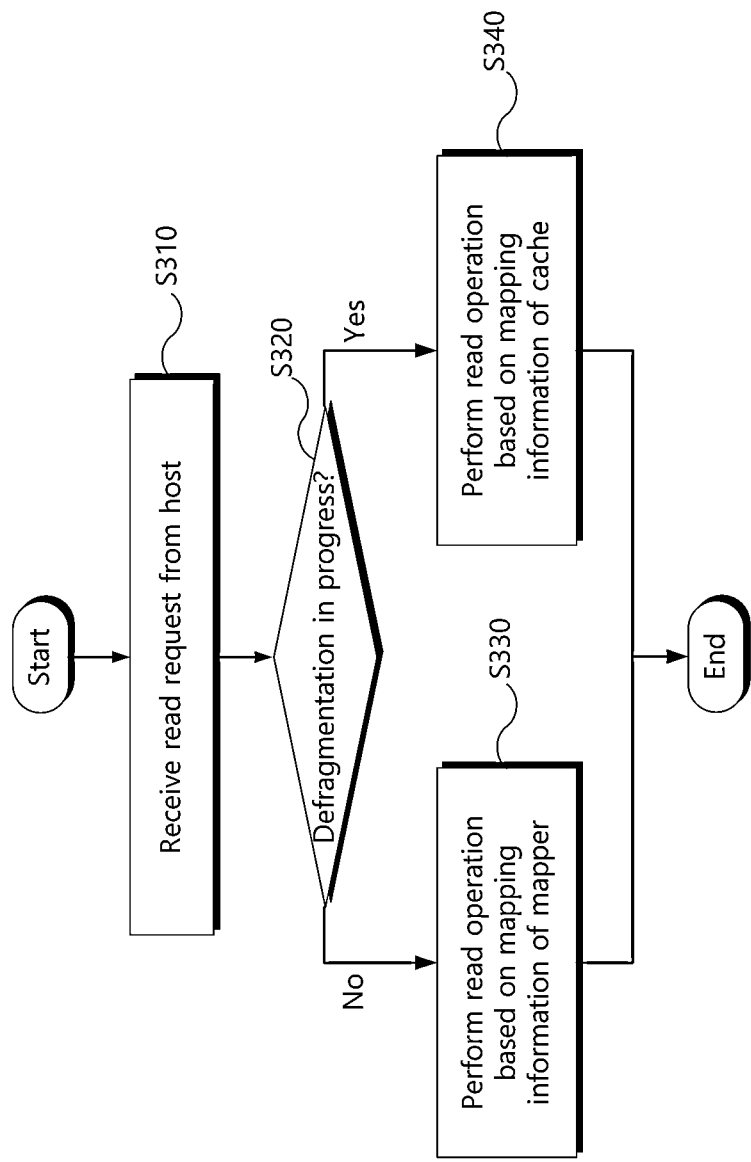

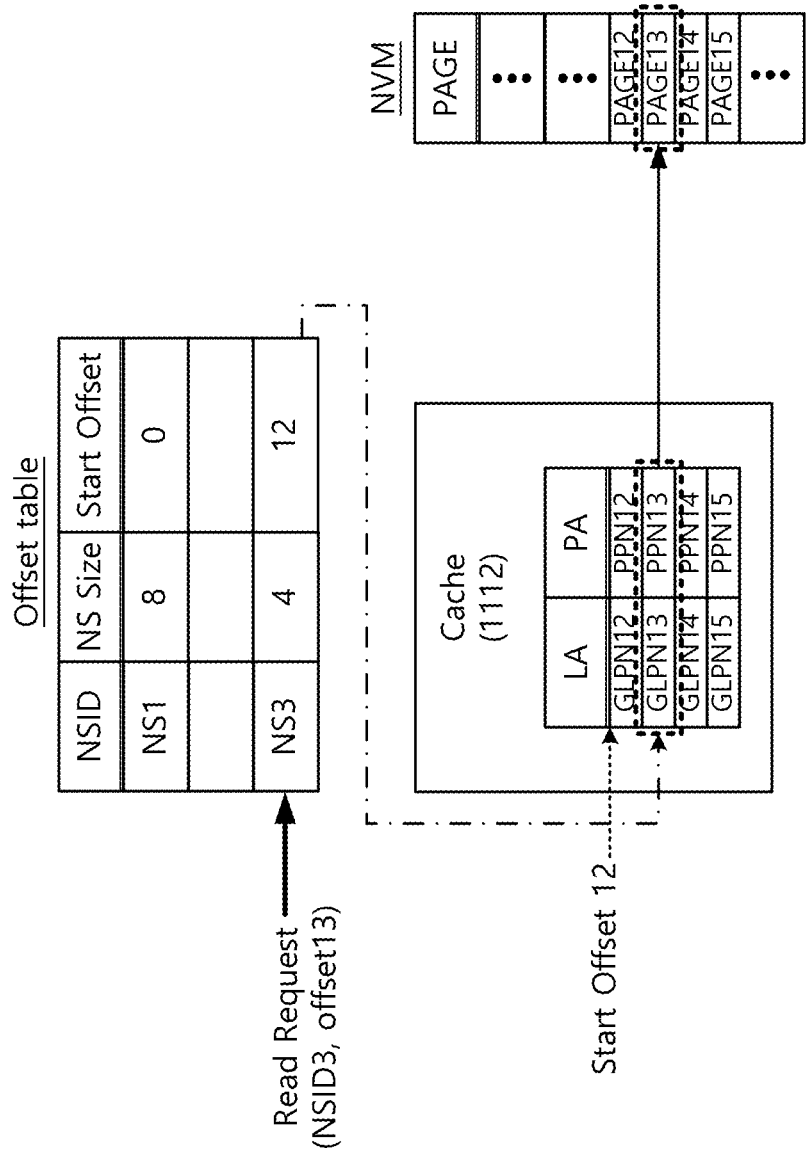

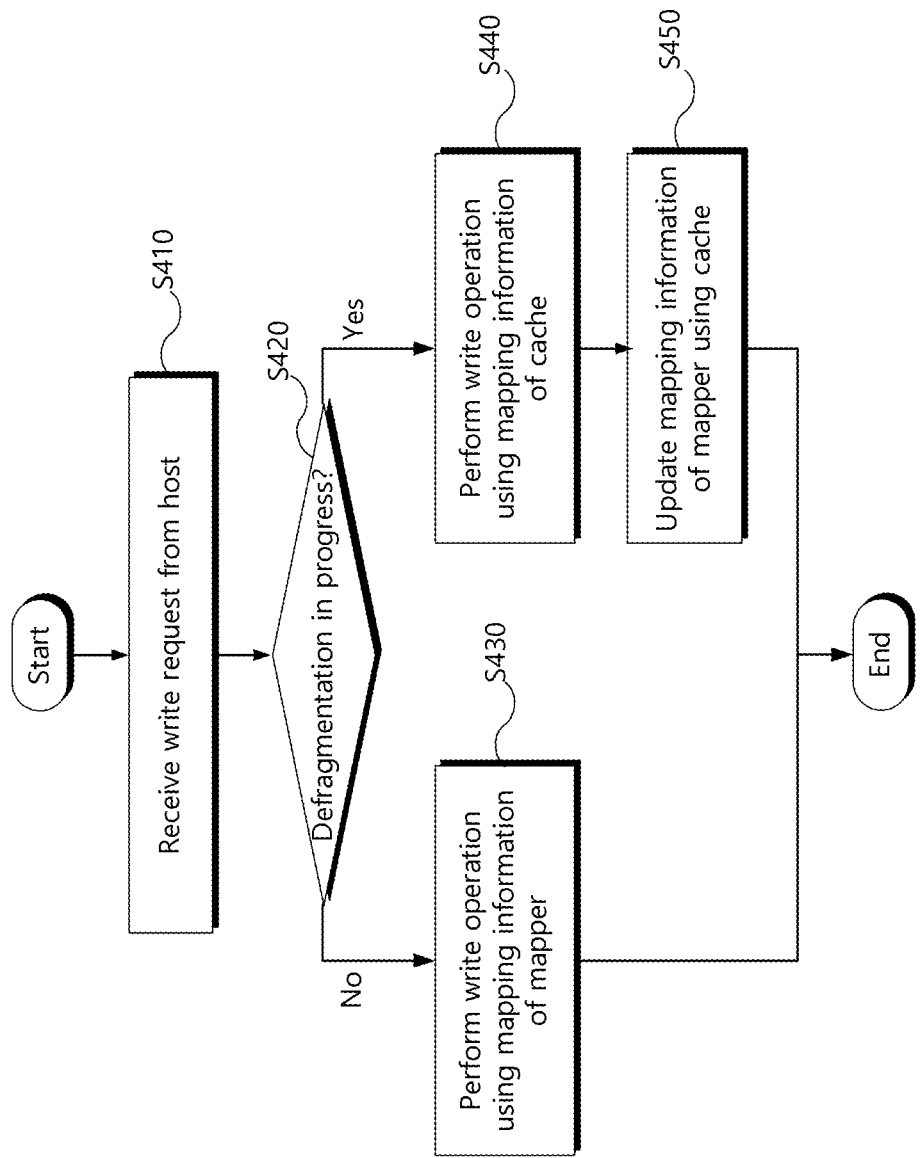

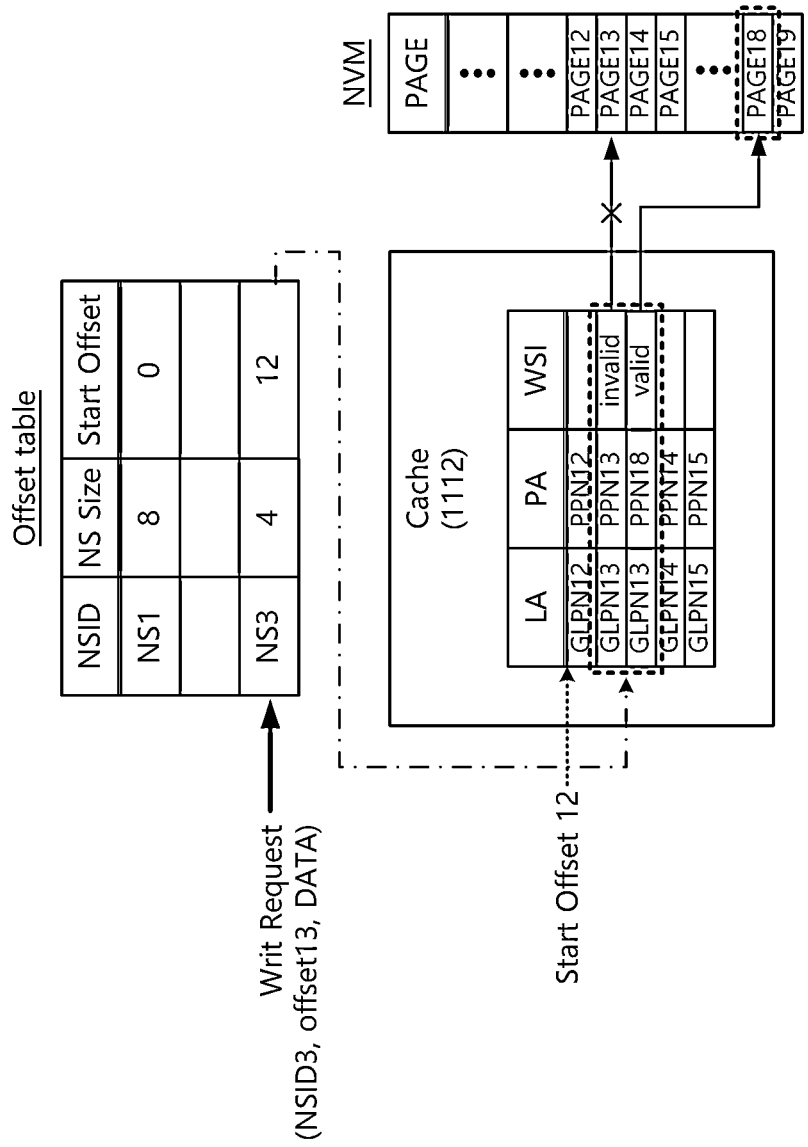

STORAGE DEVICE SUPPORTING MULTI-NAMESPACE AND METHOD OF OPERATING THE SAME

CROSS-REFERENCE TO RELATED APPLICATION(S)

This application claims benefit of priority to Korean Patent Application No. 10-2023-0006344, filed on Jan. 16, 2023, in the Korean Intellectual Property Office, the disclosure of which is incorporated herein by reference in its entirety.

BACKGROUND

The present disclosure relates to storage devices.

A semiconductor memory device is a memory device implemented using a semiconductor such as silicon (Si), germanium (Ge), gallium arsenide (GaAs), indium phosphide (InP), or the like. Semiconductor memory devices may be generally classified into volatile memory devices and nonvolatile memory devices.

A flash memory, a type of nonvolatile memory, may retain stored data thereof even when power supply thereof is interrupted. Recently, storage devices, such as solid state drives (SSDs) and memory cards, including flash memory have been widely used. Storage devices are useful for storing or moving a large amount of data. Recently, research into a storage device supporting a namespace function to provide a plurality of logical devices from a single physical device is in progress. For example, there is demand for a namespace function to smoothly service a request of a host while improving storage efficiency.

SUMMARY

Example embodiments provide storage devices supporting a multi-namespace function for rapidly responding to a request of a host while improving storage efficiency.

According to some example embodiments, a method of operating a storage device managing multi-namespaces includes deleting mapping information on a first namespace requested to be deleted from a first logical address space, loading mapping information on a second namespace, corresponding to a second logical address space contiguous to the first logical address space, into a cache, copying mapping information on the second namespace from the second logical address space to the first logical address space, deleting the mapping information on the second namespace from the second logical address space, and performing a requested write or read operation based on mapping information on the second namespace loaded into the cache based on there being a request for access to the second namespace before the copying the mapping information on the second namespace from the second logical address space to the first logical address space is completed.

According to some example embodiments, a storage device includes a nonvolatile memory and a controller configured to manage data, stored in the nonvolatile memory, through multi-namespaces. The controller may include a meta manager configured to manage mapping information between a logical address and a physical address of each of the namespaces, a memory configured to store mapping information on each of the namespaces, and a cache configured to load mapping information on a second namespace having a logical address space, contiguous to a first namespace requested to be deleted, among a plurality of namespaces, and to store the loaded mapping information on the second namespace. The meta manager may be configured to perform a write or read operation based on the mapping information on the second namespace stored in the cache based on a request for access to the second namespace is received while a defragmentation operation being performed.

According to some example embodiments, a storage system includes at least one host and a storage device configured to dynamically create a plurality of namespaces in response to a namespace creation request of the at least one host. The storage device may include a nonvolatile memory and a controller configured to manage data, stored in the nonvolatile memory, through the plurality of namespaces. The plurality of namespaces may include a first namespace, allocated to a first logical address space, and a second namespace allocated to a second logical address space, contiguous to the first logical address space. The controller may be configured to delete the first namespace in the first logical address space in response to a request of deleting the first name space, to copy the mapping information on the second namespace from the second logical address space to the first logical address space, and to load the mapping information on the second namespace into a cache.

BRIEF DESCRIPTION OF DRAWINGS

The above and other aspects, features, and advantages of the present disclosure will be more clearly understood from the following detailed description, taken in conjunction with the accompanying drawings.

FIG. 7 is a diagram illustrating an example of an operation of the storage device when a namespace requested to be deleted is a last namespace according to some example embodiments.

FIG. 8 is a flowchart illustrating a defragmentation operation of the storage device based on a request of deleting a namespace according to some example embodiments.

FIG. 9 is a diagram illustrating an example of a defragmentation operation of the storage device according to some example embodiments.

FIG. 12 is a flowchart illustrating a read operation of the storage device of FIG. 1 according to some example embodiments.

FIG. 13 is a diagram illustrating an example in which a read operation is performed using mapping information loaded into a cache according to some example embodiments.

FIG. 14 is a flowchart illustrating a write operation of the storage device of FIG. 1 according to some example embodiments.

FIG. 15 is a diagram illustrating an example in which a write operation is performed using mapping information loaded into a cache according to some example embodiments.

DETAILED DESCRIPTION

Hereinafter, example embodiments will be described with reference to the accompanying drawings.

Figure 1:
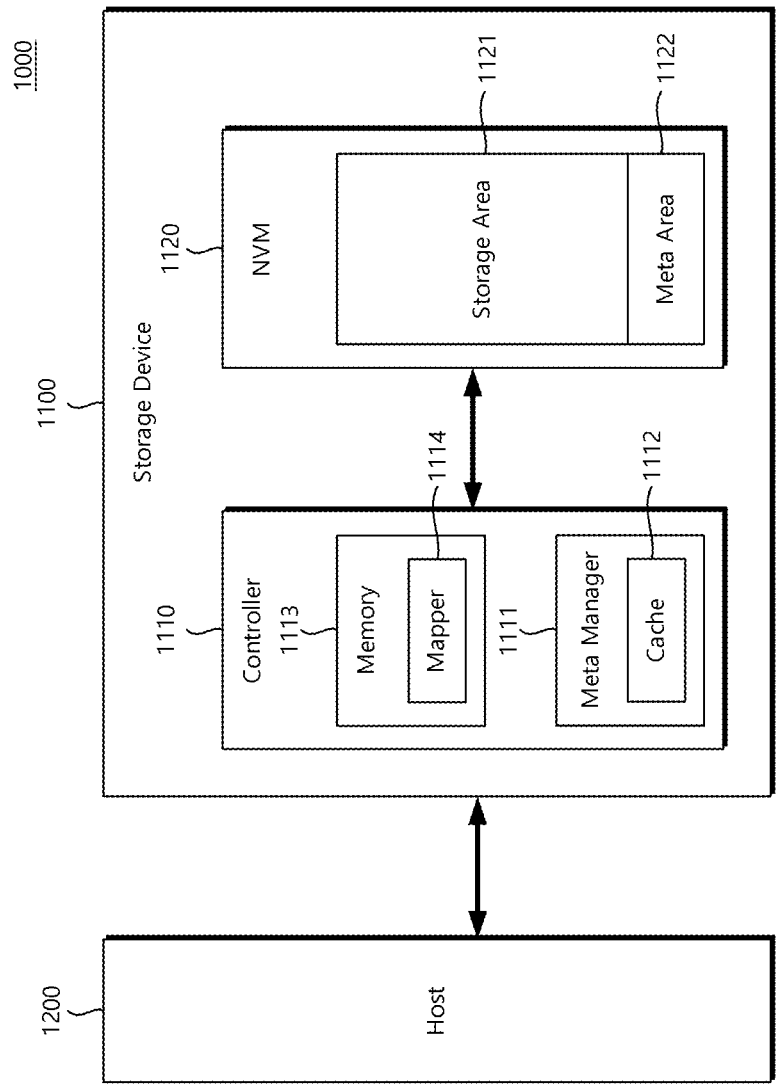
FIG. 1 is a block diagram illustrating a storage system according to some example embodiments.

FIG. 1 is a block diagram illustrating a storage system 1000 according to some example embodiments.

The storage device 1100 according to some example embodiments may support a namespace function. The term "namespace" may be defined as a quantity of a nonvolatile memory which may be formatted into logical blocks. As an example, from a perspective of a host 1200, a namespace having a size of n may be a collection of logical blocks having logical block addresses (LBA) from 0 to n-1. As another example, from a perspective of the storage device 1100, a namespace having a size of n may be a collection of logical pages having logical page numbers (LPN) from 0 to n-1.

The term "namespace function" may refer to a function of providing a plurality of logical devices from a single physical device. For example, the namespace function may be a technique of dividing the storage device 1100 into a plurality of namespaces and allocating a unique LBA or LPN logical address to each of the namespaces. The storage device 1100 may manage multi-namespaces, and thus may be described as supporting a multi-namespace function.

The storage device 1100 according to some example embodiments may manage a plurality of namespaces such that the namespaces have logical address spaces, contiguous to each other. Accordingly, fragmentation does not occur or may be reduced, so that a storage space may be efficiently used or have improved usage without waste. As described above, there may be an effect of improving storage space, thereby allowing greater storage in the same space, improved reliability of read/write operations, etc. (such as faster operation completion timing), improved power performance, improved processing performance based on the easier access to memory, as well as an effect of reducing device size or allowing greater memory usage.

In addition, when a namespace is requested to be deleted, the storage device 1100 according to some example embodiments may select a namespace to be repositioned in a logical address space of the namespace requested to be deleted, and may load mapping information of the selected namespace into a cache 1112. For example, a next space of the namespace requested to be deleted may be selected to be relocated in the logical address space of the namespace requested to be deleted. In this case, mapping information of the selected namespace may be loaded into a cache. Accordingly, even when a read request or a write request for the selected namespace is received from the host 1200 during the relocation of the selected namespace, the storage device 1100 may give a rapid response using mapping information of the selected namespace stored in the cache 1112.

A more detailed description will be provided with reference to FIG. 1. The storage system 1000 may include a storage device 1100 and a host 1200.

The storage system 1000 may be implemented as, for example, a personal computer (PC), a data server, a network-attached storage (NAS), an Internet-of-Things (IoT) device, and/or a portable electronic device. The portable electronic device may be a laptop computer, a mobile phone, a smartphone, a tablet PC, a personal digital assistant (PDA), an enterprise digital assistants (EDA), a digital still camera, a digital video camera, an audio device, a portable multimedia player (PMP), and a personal navigation device (PND), an MP3 player, a handheld game console, an e-book, a wearable device, or the like.

The host 1200 may communicate with the storage device 1100 through various interfaces. For example, the host 1200 may transmit a read request or a write request to the storage device 1100. Also, the host 1200 may transmit namespace management commands, such as namespace creation and deletion requests, to the storage device 1100. In some example embodiments, the host 1200 may be an application processor (AP). In some example embodiments, the host 1200 may be implemented as a system on a chip (SoC).

The storage device 1100 may be an internal memory embedded in an electronic device. For example, the storage device 1100 may be an SSD, an embedded universal flash storage (UFS) memory device, or an embedded multimedia card (eMMC). In some example embodiments, the storage device 1100 may be an external memory removable from an electronic device. For example, the storage device 1100 may be a UFS memory card, a compact flash (CF) card, a secure digital (SD) card, a micro secure digital (Micro-SD) card, a mini secure digital (Mini-SD) card, an extreme digital (xD) card, or a memory stick.

The storage device 1100 may include a controller 1110 and a nonvolatile memory 1120.

The controller 1110 may read data, stored in the nonvolatile memory 1120, or write data in the nonvolatile memory 1120 in response to a read request and/or a write request from the host 1200. The controller 1110 may include a meta manager 1111, a cache 1112, a memory 1113, and a mapper 1114.

The meta manager 1111 may manage operations of dynamically creating and deleting a namespace using the mapper 1114. For example, the meta manage 1111 may update mapping information of the mapper 1114 during the operations of creating and deleting a namespace such that a plurality of namespaces have logical address spaces, contiguous to each other.

In some example embodiments, the meta manager 1111 may dynamically create a namespace in response to the namespace creation request from the host 1200. In this case, the meta manager 1111 may allocate a logical address space to a namespace to be newly created such that a logical address space of the namespace to be newly created is contiguous to a logical address space of a previously created namespace. The meta manager 1111 may update mapping information on a logical address space and a physical address space of a crated namespace to the mapper 1114.

In some example embodiments, the meta manager 1111 may dynamically delete a namespace in response to the namespace deletion request from the host 1200. In this case, the meta manager 1111 may perform a defragmentation operation such that namespaces, remaining after the deletion operation, have logical address spaces contiguous to each other. The term "defragmentation operation" may refer to an operation of copying mapping information of a selected namespace to an empty logical address space of a deleted namespace.

For example, the meta manager 1111 may select a namespace having a logical address space, contiguous to a deleted namespace, as a namespace on which a defragmentation operation is to be performed. For example, when a namespace to be deleted is an n-th namespace, an (n+1)-th namespace may be selected as a namespace on which a defragmentation operation is to be performed. The meta manager 1111 may move mapping information of the selected namespace to an empty logical address space of the deleted namespace. In some example embodiments an (n+1)-th to (n+m)-th namespaces may be selected as namespaces on which a defragmentation operation is to be performed. For example, the (n+1)-th to (n+m)-th namespaces may be individually moved during a defragmentation operation or may be grouped together to be moved. In some example embodiments, namespaces before the n-th namespace (for example, a 1st or an (n−1)-th namespace) may be selected as a namespace on which a defragmentation operation is to be performed.

In addition, when a namespace is requested to be deleted, the meta manager 1111 according to some example embodiments may load mapping information of the namespace, on which the defragmentation operation is to be performed, into the cache 1112. For example, the mapping information of the namespace, on which the defragmentation operation is to be performed, may be loaded into the cache 1112 in predetermined (or, alternatively, desired, selected, or generated) units before the defragmentation operation is performed. In this case, the mapping information loaded into the cache 1112 may be retained until the defragmentation operation is completed. Accordingly, the controller 1110 may rapidly respond to a request of the host 1200 based on the mapping information stored in the cache 1112, even when a read request or a write request for a namespace, on which the defragmentation operation is in progress, is received from the host 1200.

The cache 1112 may load the mapping information of the namespace, on which the defragmentation operation is to be performed, from the mapper 1114 and may store the loaded mapping information therein. The mapping information, stored in the cache 1112, may be retained until the defragmentation operation is completed. For example, when a request for access to the namespace, on which the defragmentation operation is in progress, is received, the controller 1110 may process the request for access using the mapping information stored in the cache 1112, rather than the mapping information stored in the mapper 1114.

The cache 1112 may be implemented as, for example, an SRAM or a DRAM having high input and output speeds, rather than a memory constituting the nonvolatile memory 1120. However, this is in some example embodiments, and the cache 1112 may be implemented as a nonvolatile memory or heterogeneous memories.

In FIG. 1, the cache 1112 is illustrated as being included in the meta manager 1111. However, this is in some example embodiments, and example embodiments are not limited thereto. According to example embodiments, the cache 1112 may be implemented as a memory, independent of the meta manager 1111. Alternatively, according to example embodiments, a portion of the memory 1113 may be used as the cache 1112.

The memory 1113 may be used as a working memory or a buffer memory. Alternatively, according to example embodiments, the memory 1113 may be used as a cache. For example, the memory 1113 may be implemented as a DRAM. However, this is in some example embodiments, and the memory 1113 may be implemented as a nonvolatile memory such as a PRAM or a flash memory, as well as a volatile memory such as a DRAM or an SRAM.

The mapper 1114 may be loaded into the memory 1113. The mapper 1114 may include mapping information on a logical address space and a physical address space of namespaces. For example, the mapper 1114 may manage the mapping information of the namespaces through an L2P table to translate a logical address into a physical address.

The nonvolatile memory 1120 may include a memory cell array MCA, and the memory cell array MCA may include a storage area 1121 for storing user data and a meta area 1122 for storing meta data.

In some example embodiments, the memory cell array MCA may include a plurality of flash memory cells, and the plurality of flash memory cells may be, for example, NAND flash memory cells. However, example embodiments are not limited thereto, and the memory cells may be resistive memory cells such as resistive RAM (RRAM) memory cells, phase-change RAM (PRAM) memory cells, or magnetic RAM (MRAM) memory cells.

In some example embodiments, the meta area 1122 may store the mapper 1114 in which mapping information between a logical address and a physical address is stored. For example, when power is applied to the storage device 1100, the mapper 1114 stored in the nonvolatile memory 1120 may loaded into the memory 1113 of the controller 1110.

As described above, the storage device 1100 according to some example embodiments may manage a plurality of namespaces such that the namespaces have logical address spaces contiguous to each other, and may load mapping information of a namespace, on which a defragmentation operation is to be performed, into the additional cache 1112. Accordingly, the storage device 1100 may efficiently use or have an improved usage of a storage space and may rapidly process a read or write request received from the host 1200 even during a defragmentation operation. As described above, there may be an effect of improving access to memory functions during defragmentation operations, thereby improving reliability, processing capability, power usage by reducing communication delays and/or the like.

Figure 2:
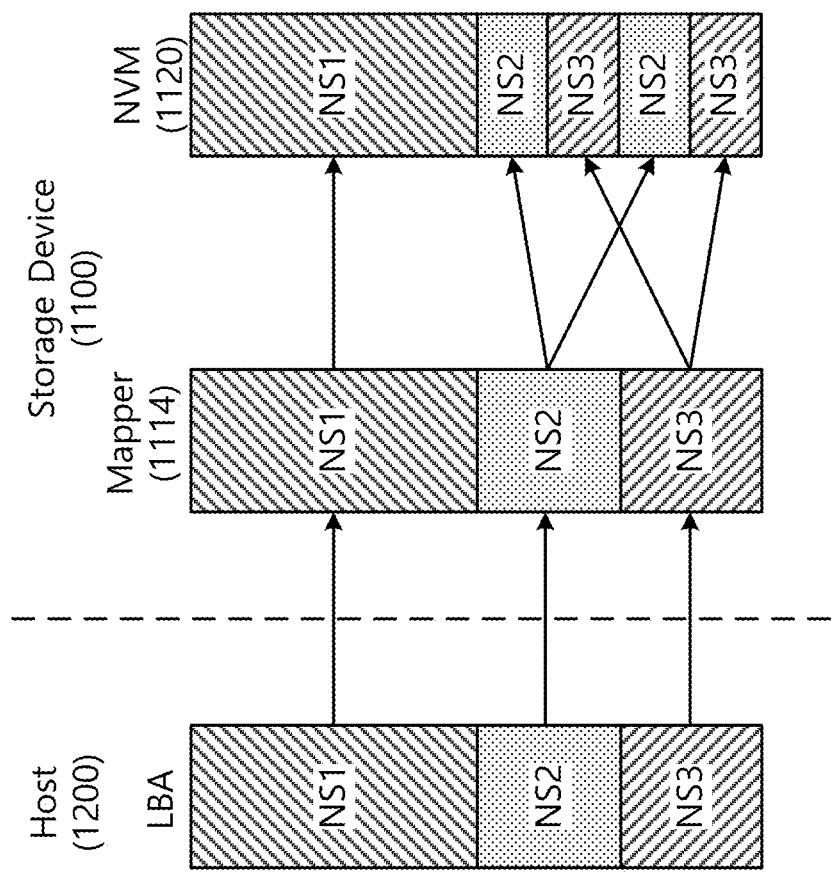
FIG. 2 is a diagram provided to describe a multi-namespace function of the storage device of FIG. 1.

FIG. 2 is a diagram provided to describe a multi-namespace function of the storage device 1100 of FIG. 1. For ease of description, in FIG. 2, it will be assumed that a single nonvolatile memory 1120 is provided as a physical device and three namespaces are created as a logical device.

Referring to FIG. 2, three namespaces NS1 to NS3 may be created in the storage device 1100. Logical address spaces and physical address spaces may be mapped in a one-to-one manner. Accordingly, an entire logical address space provided by the namespaces NS1 to NS3 may be smaller than or equal to a physical address space of a nonvolatile memory NVM. In addition, the three namespaces NS1 to NS3 may share a single mapper 1114.

In more detail, some address spaces (for example, LBA0 to LBA7) in the entire logical address space may be allocated to the first namespace NS1, some address spaces (for example, LBA8 to LBA11), contiguous to the address space allocated to the first namespace NS1, in the entire logical address space may be allocated to the second namespace NS2, and some address spaces (for example, LBA12 to LBA15), contiguous to the address space allocated to the second namespace NS2, in the entire logical address space may be allocated to the third namespace NS3.

The term "logical block address (LBA)" may be a unit of a logical address managed from a perspective of the host 1200. However, this is in some example embodiments, and the host 1200 may allocate a logical address space in units, other than units of blocks. For example, the host 1200 may allocate a logical address space in units of pages.

The mapper 1114 may match of the logical address spaces of the namespaces NS1 to NS3 with physical address spaces. For example, the mapper 1114 may match logical address spaces of the namespaces NS1 to NS3 with physical address spaces of the nonvolatile memory 1120 in a one-to-one manner.

In some example embodiments, the nonvolatile memory 1120 may be an SSD, and a physical address space of the nonvolatile memory 1120 may be managed in units of pages. In this case, the mapper 1114 may translate logical addresses in units of blocks into logical addresses in units of pages, and may match logical address spaces in units of pages and physical address spaces in units of pages with each other in a one-to-one manner. However, this is in some example embodiments, and the mapper 1114 may match logical address spaces and physical address spaces with each other in units of blocks or may match logical address spaces and physical address spaces with each other both in units of blocks and in units of pages.

For ease of description, it will be assumed herein that units of blocks and units of pages match each other. For example, it will be assumed that a unit of logical page number (LPN) from the perspective of the host 1200 and a unit of LPN from a perspective of the storage device 1100 match each other. However, this is in some example embodiments, and units of blocks may be greater than or smaller than units of pages according to example embodiments.

As illustrated in FIG. 2, the logical address spaces of the first to third namespaces NS1 to NS3 are allocated to be contiguous to each other. Accordingly, fragmentation in the physical address space may not occur, so that a size of the mapping table managed by the mapper 1114 may be relatively small as compared with the case in which logical address spaces are not contiguous to each other. For this reason, a storage space of the memory 1113 required to load the mapper 114 may be relatively small. As a result, waste of the storage space may be prevented or reduced. As described above, there may be an effect of improving storage space, thereby allowing greater storage in the same space, improved reliability of read/write operations, etc. (such as faster operation completion timing), improved power performance, improved processing performance based on the easier access to memory, as well as an effect of reducing device size or allowing greater memory usage.

Figure 3:
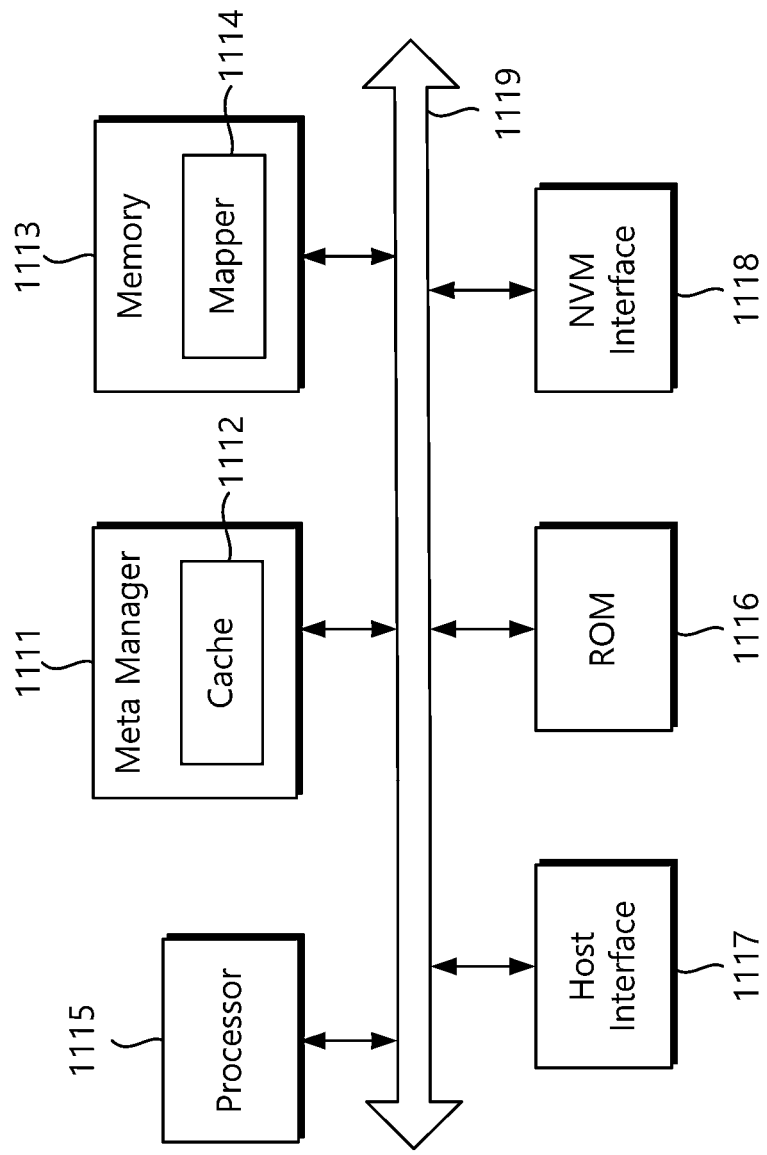
FIG. 3 is a block diagram illustrating an example of the controller of FIG. 1.

FIG. 3 is a block diagram illustrating an example of the controller 1110 of FIG. 1. Referring to FIG. 3, the controller 1110 may include a meta manager 1111, a memory 1113, a processor 1115, a read-only memory (ROM) 1116, a host interface 1117, and a nonvolatile memory interface 1118, which may communicate with each other through a bus 1119.

The meta manager 1111 may be implemented as an additional hardware IP. For example, the meta manager 1111 may be implemented to include at least one processor and may be implemented to additionally include a cache 1112 therein. However, this is in some example embodiments, and the meta manager 1111 may be implemented as software or firmware. In this case, the meta manager 1111 implemented as software or firmware may be loaded into the memory 1113 to operate.

In some example embodiments, the meta manager 1111 may manage operations of creating and deleting a namespace such that a plurality of namespaces have a continuous logical address space. For example, during the operation of deleting the namespace, the meta manager 1111 may load mapping information of the namespace, on which a fragmentation operation is to be performed, from the mapper 1114 to the cache 1112.

The memory 1113 may operate under the control of the processor 1115 and may be used as a working memory or a buffer memory. However, this is in some example embodiments, and the memory 1113 may be used as a cache memory. In this case, the mapping information of the namespace, on which the fragmentation operation is to be performed, may be loaded into the memory 1113.

The memory 1113 may store the mapper 1114. For example, when a power is applied to the storage device 1100, the mapper 1114 stored in the meta area 1122 of the nonvolatile memory 1120 may be loaded into the memory 1113. The mapper 1114 may include, for example, mapping information on logical address spaces and the physical address spaces of the namespaces.

The processor 1115 may include a central processing unit (CPU) or a microprocessor, and may control the overall operation of the controller 1110.

The ROM 1116 may store code data required for initial booting of the storage device 1100.

The host interface 1117 may provide an interface between the host 1200 and the controller 1110 and may provide, for example, an interface based on a universal serial bus (USB), a multimedia card (MMC), a peripheral component interconnect express (PCI-E), an advanced technology attachment (ATA), a serial ATA (SATA), a parallel ATA (PATA), a small computer system interface (SCSI), a serial attached SCSI (SAS), an enhanced small disk interface (ESDI), an integrated drive electronics (IDE), or the like.

The nonvolatile memory interface 1118 may provide an interface between the controller 1110 and the nonvolatile memory 1120.

Figure 4:
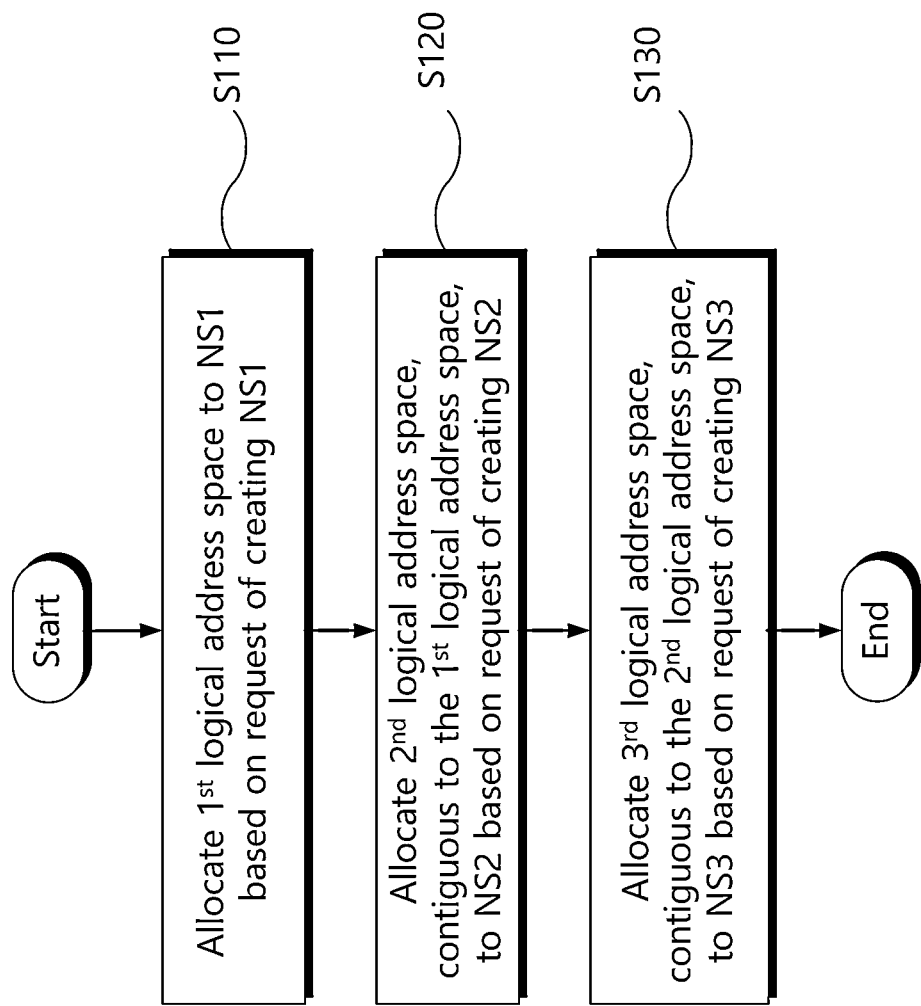
FIG. 4 is a flowchart illustrating an operation of allocating a logical address space by the storage device based on a request of creating a namespace according to some example embodiments.
Figure 5:
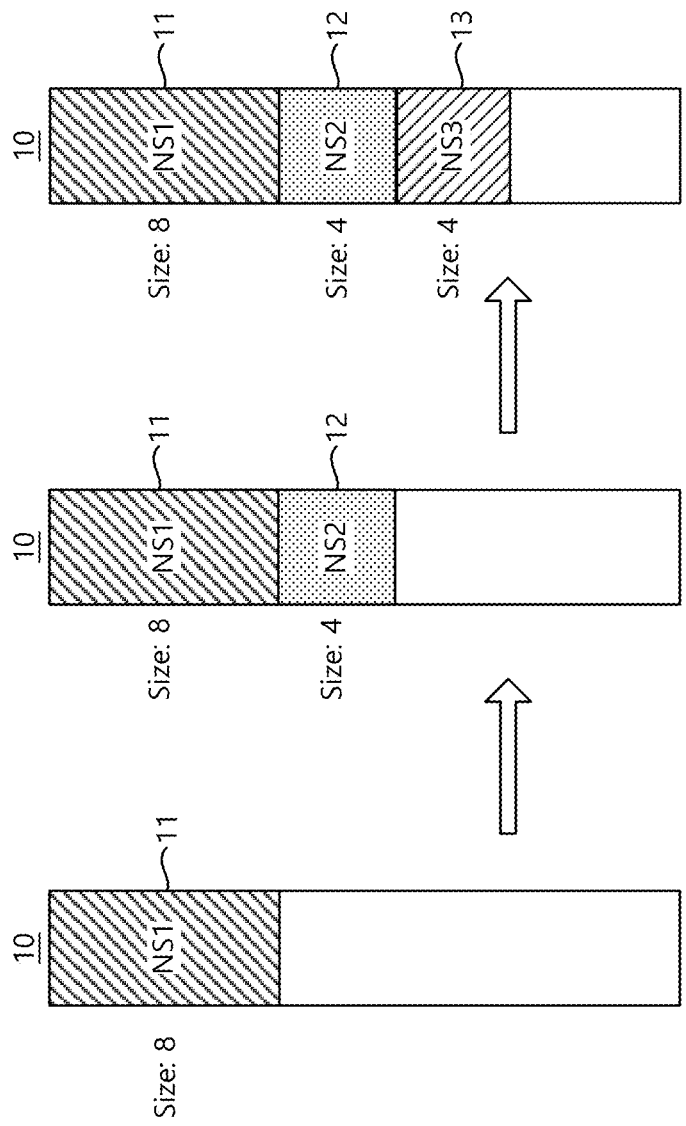
FIG. 5 is a diagram illustrating an example in which the storage device allocates a logical address space according to some example embodiments.

FIGS. 4 and 5 are diagrams provided to describe an operation of the storage device 1100 based on a request of creating a namespace NS according to some example embodiments. For example, FIG. 4 is a flowchart illustrating an operation of allocating a logical address space by the storage device 1100 in response to the request of creating the namespace NS, and FIG. 5 is a diagram illustrating an example in which the storage device 1100 allocates a logical address space.

For ease of description, hereinafter, it will be assumed that three namespaces are created. In addition, it will be assumed that logical address spaces are allocated in units of pages.

Referring to FIG. 4, in operation S110, the storage device 1100 may allocate a first logical address space to a first namespace NS1 in response to a request of creating the first namespace NS1.

For example, a size of the first namespace NS1 may be "8," as illustrated in FIG. 5. In this case, in a logical address space 10, a first logical address space 11 from LPN0 to LPN7 may be allocated to the first namespace NS1.

In operation S120, the storage device 1100 may allocate a second logical address space to a second namespace NS2 in response to a request of creating the second namespace NS2. In this case, the second logical address space may be contiguous to the first logical address space.

For example, a size of the second namespace NS2 may be "4," as illustrated in FIG. 5. In this case, in the logical address space 10, a second logical address space 12 from LPN8 to LPN11 may be allocated to the second namespace NS2.

In operation S130, the storage device 1100 may allocate a third logical address space to a third namespace NS3 in response to a request of creating the third namespace NS3. In this case, the third logical address space may be contiguous to the second logical address space.

For example, a size of the third namespace NS3 may be "4," as illustrated in FIG. 5. In this case, in the logical address space 10, a third logical address space 13 from LPN12 to LPN15 may be allocated to the third namespace NS3.

In such a manner, the storage device 1100 may allocate a logical address space to a namespace to be newly created, such that a logical address space of the namespace to be newly created is contiguous to a logical address space of a previously created namespace.

Figure 6:
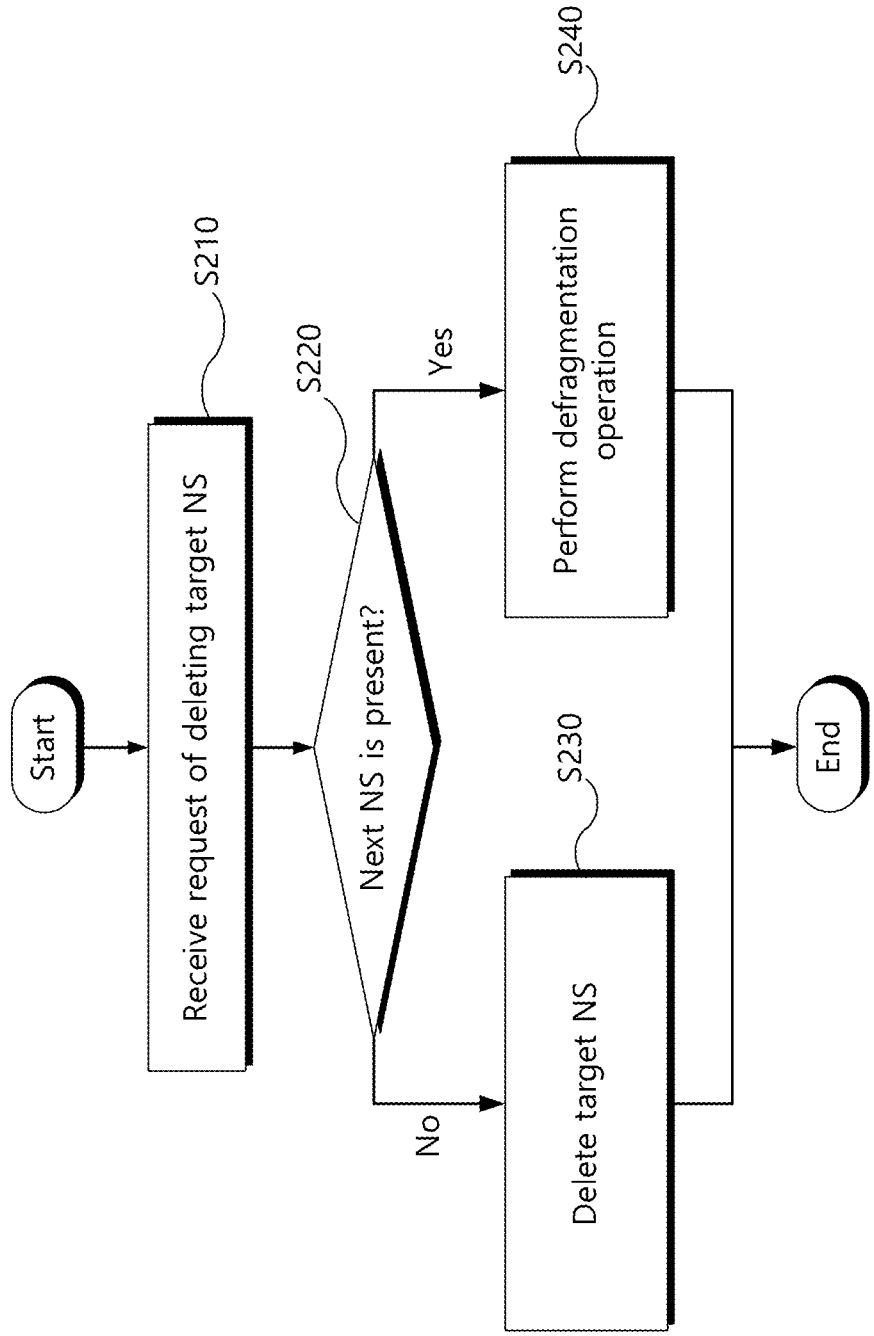
FIG. 6 is a flowchart illustrating a difference in a method of operating the storage device, depending on a state of a namespace requested to be deleted according to some example embodiments.

FIGS. 6 and 7 are diagrams provided to describe an operation of the first storage device 1100 based on a request of deleting a namespace NS according to some example embodiments. For example, FIG. 6 is a flowchart illustrating a difference in a method of operating the storage device 1100, depending on a state of a namespace NS requested to be deleted, and FIG. 7 is a diagram illustrating an example of an operation of the storage device 1100 when a namespace NS requested to be deleted is a last namespace NS.

For ease of description, hereinafter, it will be assumed that a request of deleting a third namespace NS3 is received in a state in which third namespaces NS1 to NS3 are created. In addition, similarly to FIGS. 4 and 5, logical address spaces are allocated in units of pages.

Referring to FIG. 5, in operation S210, a request of deleting a target namespace target NS may be received. For example, a request of deleting the third namespace NS3 may be received on a logical address space 20, as illustrated in FIG. 7.

In operation S220, the storage device 1100 may determine whether a next namespace of the target namespace is present. For example, the storage device 1100 may determine whether the target namespace is located in a last address space on a logical address space.

When the next namespace is not present, the flow may proceed to operation S230. In operation S230, the storage device 1100 may delete the target namespace from the logical address space. For example, as illustrated in FIG. 7, when the third namespace NS3 requested to be deleted is located in a last address space in the logical address space 20, the third namespace NS3 may be deleted from a logical address space 20. In this case, logical address spaces of remaining namespaces NS1 and NS2 may be contiguous to each other.

On the other hand, when the next namespace is present, the flow may proceed to operation S240. In operation S240, the storage device 1100 may perform a defragmentation operation. This will be described below in more detail with reference to FIGS. 8 and 9.

FIGS. 8 and 9 are diagram provided to describe an operation of the storage device 1100 of FIG. 1 based on a request of deleting a namespace according to some example embodiments. For example, FIG. 8 is a flowchart illustrating a defragmentation operation of the storage device 1100 based on a request of deleting a namespace, and FIG. 9 is a diagram illustrating an example of the defragmentation operation of the storage device 1100.

For ease of description, hereinafter, it will be assumed that a request of deleting a second namespace NS2 is received in a state in which three namespaces NS1 to NS3 are created. In addition, similarly to FIGS. 4 and 5, it will be assumed that logical address spaces are allocated in units of pages.

Referring to FIG. 8, in operation S241, the storage device 1100 may delete the second namespace NS2 from a second logical address space based on a request of deleting the second namespace NS2.

For example, the second namespace NS2 may be deleted from a second logical address space 32 on a logical address space 30, as illustrated in FIG. 9. Accordingly, first logical address space 31 of a remaining first namespace NS1 and a third logical address space 33 of a remaining third namespace NS3 may not be contiguous to each other.

In operation S242, the storage device 1100 may load mapping information of the third namespace NS3 into the cache 1112.

For example, the mapping information of the third namespace NS3 may be loaded into the cache 1112 in predetermined (or, alternatively, desired, selected, or generated) units, as illustrated in FIG. 9. Accordingly, the storage device 1100 may rapidly respond to a request of the host 1200 based on the mapping information stored in the cache 1112 even when a read request or a write request for the third namespace NS3 is received from the host 1200 while the defragmentation operation is performed.

In some example embodiments, loading of mapping information may be performed in units of pages. However, this is in some example embodiments, and the mapping information may be loaded in various units such as blocks, wordlines, or cache lines, other than pages, according to example embodiments.

In operation S243, the storage device 1100 may copy the mapping information of the third namespace NS3 to the second logical address space.

For example, the mapping information of the third namespace NS3 may be copied to the second logical address space 32 which is empty in predetermined (or, alternatively, desired, selected, or generated) units, as illustrated in FIG. 9. In this case, the mapping information may be copied to the second logical address space 32 in the same units as the mapping information is loaded into the cache 1112. However, the mapping information may be copied to the second logical address space 32 in units, different from units in which the mapping information is loaded into the cache 1112.

According to example embodiments, some areas of the mapping information of the third namespace may be loaded into the cache 1112, and then copied to the second logical address space 32. Such loading and copying operations may be repeated until the mapping information of the third namespace NS3 is all loaded and copied.

In addition, according to example embodiments, the mapping information of the third namespace NS3 may be all loaded to the cache 1112, and then copied to the second logical address space 32.

In addition, according to example embodiments, the operation of loading the mapping information of the third namespace NS3 into the cache 1112 and the operation of copying the mapping information of the third namespace NS3 to the second logical address space 32 may be simultaneously (for example, at the same time, about the same time, at overlapping times, etc.) performed.

In operation S244, the storage device 1100 may unmap the mapping information of the third namespace NS3 from the third logical address space 33 after the operation of copying the mapping information of the third namespace NS3 to the second logical address space 32 is completed. Also, the storage device 1100 may no longer retain the mapping information of the third namespace NS3 stored in the cache 1112.

For example, as illustrated in FIG. 9, when the operation of copying the mapping information of the third namespace NS3 to the second logical address space 32 is completed, a logical address space 31, to which the first namespace NS1 is allocated, and a logical address space 32, to which the third namespace NS3 is allocated, may be contiguous to each other. Accordingly, fragmentation to be described later as in FIGS. 10A to 10C may not occur or be reduced, so that a storage space may be efficiently used.

In addition, since the operation of copying the mapping information of the third namespace NS3 to the second logical address space 32 is completed, the storage device 1100 may no longer retain the mapping information of the third namespace NS3 stored in the cache 1112, and may delete the mapping information. Thus, a storage space of the cache 1112 may also be used without waste.

As described above, the storage device 1100 according to some example embodiments may support a defragmentation operation and may store mapping information in the cache 1112 during the defragmentation operation. Accordingly, a storage area may be efficiently used, and a received read or write request may be rapidly processed even during the defragmentation operation.

Figure 10A:
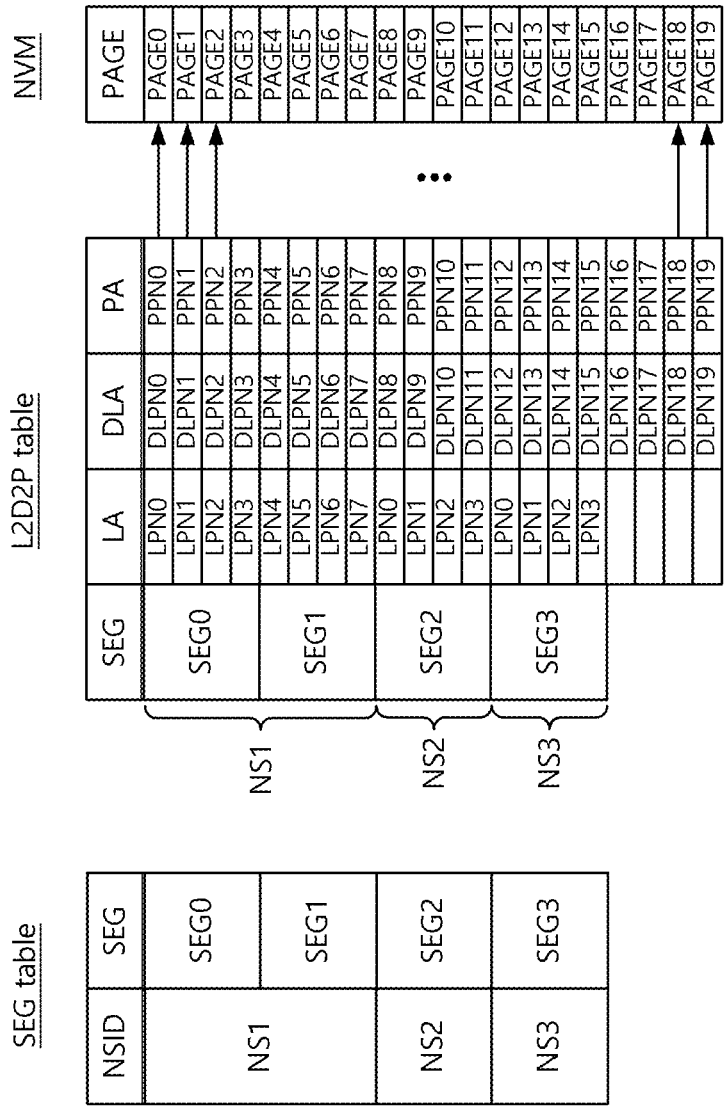
FIGS. 10A to 10C are diagrams illustrating an example of operations of creating and deleting a namespace when a defragmentation operation is not supported.
Figure 10B:
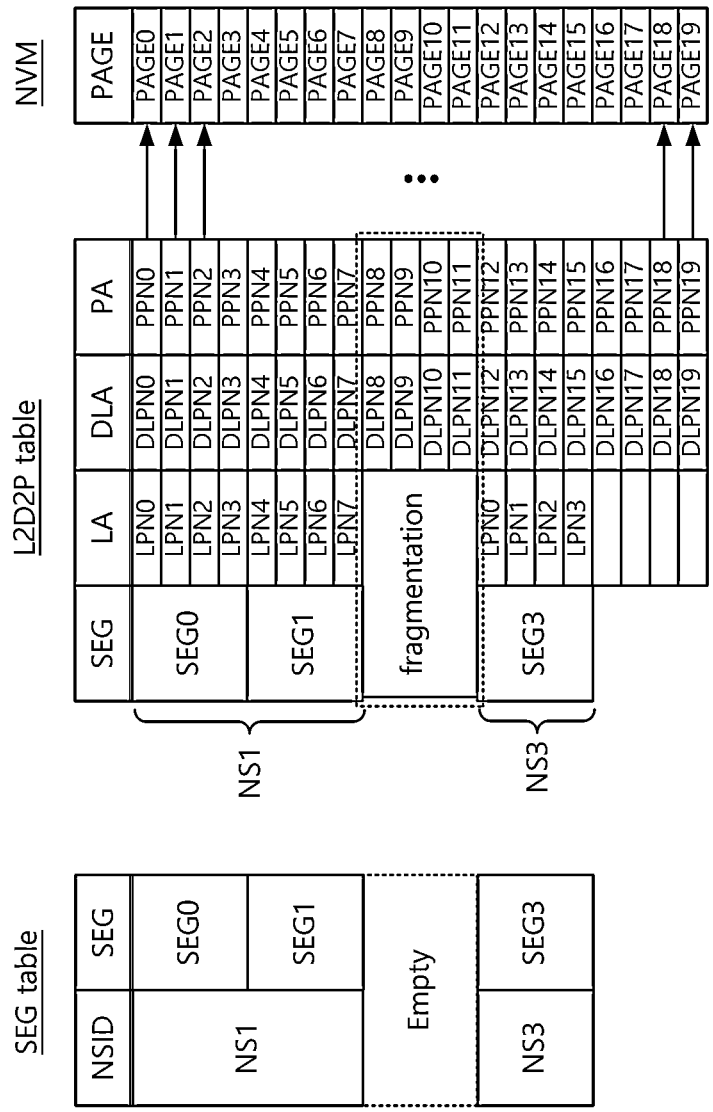
Figure 10C:
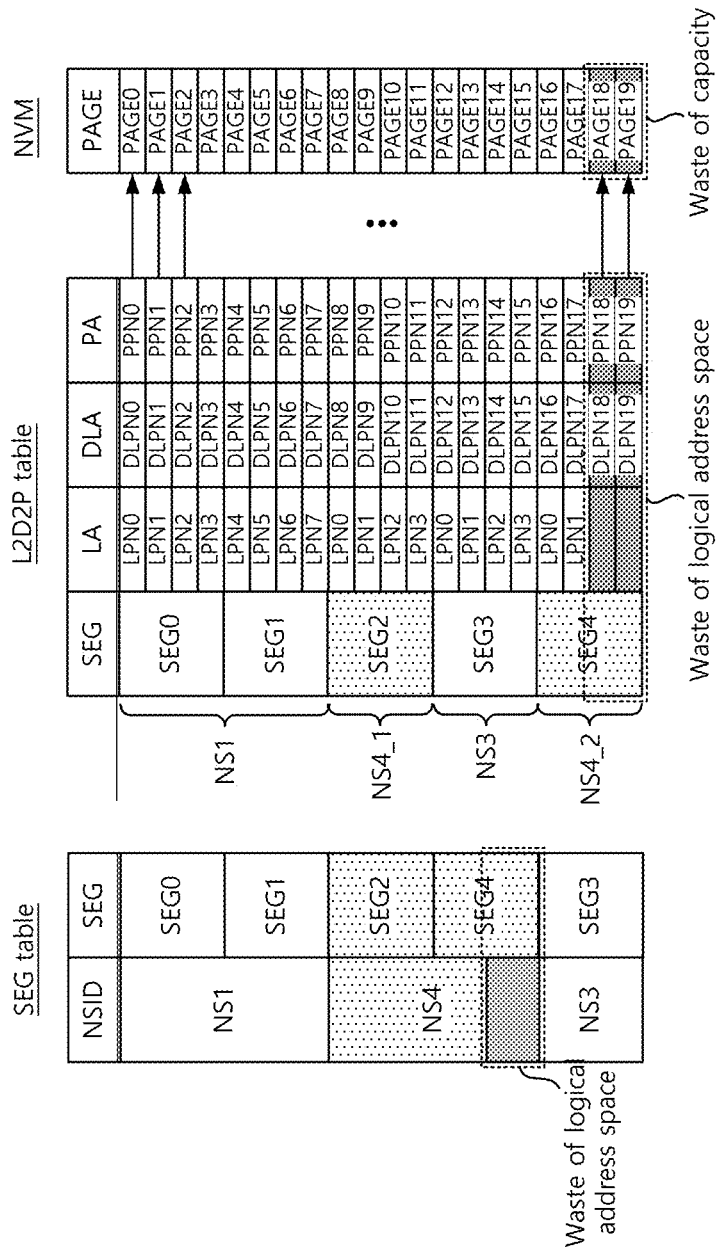

FIGS. 10A to 10C and 11A to 11E are diagrams provided to describe a defragmentation operation according to some example embodiments in more detail. For example, FIGS. 10A to 10C are diagrams illustrating an example of operations of creating and deleting a namespace NS when a defragmentation operation is not supported, and FIGS. 11A to 11E are diagrams illustrating an example of operations of creating and deleting a namespace NS of the storage device 1100 of FIG. 1 supporting a defragmentation operation.

For ease of description, hereinafter, it will be assumed that a request of deleting a second namespace NS2 is received in a case in which three namespaces NS1 to NS3 are created, similarly to FIG. 9. In addition, it will be assumed that a request of deleting a fourth namespace NS4 is received. In addition, it will be assumed that logical address spaces are allocated in units of pages, similarly to FIGS. 5 and 9. In addition, it will be assumed that sizes of the first to fourth namespaces NS1 to NS4 are 8, 4, 4, and 6, respectively.

Referring to FIG. 10A, in the case of a storage device which does not support a defragmentation operation, each namespace NS may be managed in units of segments SEG. For example, each segment SEG may be set to correspond to four LPNs. In this case, a first namespace NS1 may correspond to two segments SEG0 and SEG1, and a second namespace NS2 may correspond to a single segment SEG2 and a third namespace NS3 may correspond to a single segment SEG3. The storage device may manage mapping information of each namespace NS and each segment SEG through an SEG table.

Also, the storage device may manage mapping information between a logical address LA and a physical address PA, corresponding to each namespace NS, through an L2D2P table. In this case, the logical address LA is contiguous only within each namespace NS and is not contiguous in an entire logical address space. Accordingly, the logical address LA needs to be translated into an address contiguous in the entire logical address space, so that the L2D2P table may additionally include a device logical address DLA.

As a result, the storage device may include the SEG table and the L2D2P table, and the SEG table may manage mapping information between a namespace NS and the segment SEG and the L2D2P table may manage mapping information between a segment SEG, a logical address LA, a device logical address DLA, and a physical address PA. Accordingly, a space of a memory required to store the mapping information may be relatively large.

Referring to FIG. 10B, a request of deleting a second namespace NS2 may be received. In this case, in an SEG table, mapping information of the second namespace NS2 and a second segment SEG2 may be deleted. In an L2D2P table, mapping information on the second segment SEG2 and a logical address LA may be deleted.

Since a general storage device does not support a defragmentation operation, a logical address space (for example, DLPN0 to DLNP7) allocated to a remaining first namespace NS1 and a logical address space (for example, DLPN12 to DLPN15) allocated to a remaining third namespace NS3 may not be contiguous to each other. For example, fragmentation may occur between logical address spaces of the remaining namespaces NS1 and NS3.

Referring to FIG. 10C, a request of creating a fourth namespace NS4 may be received. In this case, since a size of the fourth namespace NS4 is 6, two segments SEG2 and SEG4 may be allocated to the fourth namespace NS4. Since a size of each segment SEG is 4, waste may occur on a logical address space managed in the SEG table.

In addition, a size of a logical address space, empty due to deletion of the second namespace NS2, is smaller than a size of the fourth namespace NS4 to be newly created, so that the segments SEG2 and SEG4 corresponding to the fourth namespace NS4 may be separated from each other on the logical address space.

For example, of the segments SEG2 and SEG4 corresponding to the fourth namespace NS4, the second segment SEG2 may be allocated to a logical address space (for example, DLPN8 to DLPN11) between a first segment SEG1 and a third segment SEG3 and the fourth segment SEG4 may be allocated to a next logical address space (for example, DLPN16 to DLNP19) of the third segment SEG3, as illustrated in FIG. 10C. In this case, a logical address space corresponding to DLPN18 and DLPN19 may be wasted, and pages PAGE18 and PAGE19 corresponding to the logical address space may not be used, resulting in waste of a physical address space.

Meanwhile, the storage device 1100 according to some example embodiments supports a defragmentation operation, so that such waste of a logical address space and such waste of a physical address space may be significantly reduced. In addition, mapping information of a namespace NS, on which a defragmentation operation is to be performed, may be loaded into an additional cache 1112, so that a request received from the host 1200 maybe rapidly processed even during the defragmentation operation.

Figure 11A:
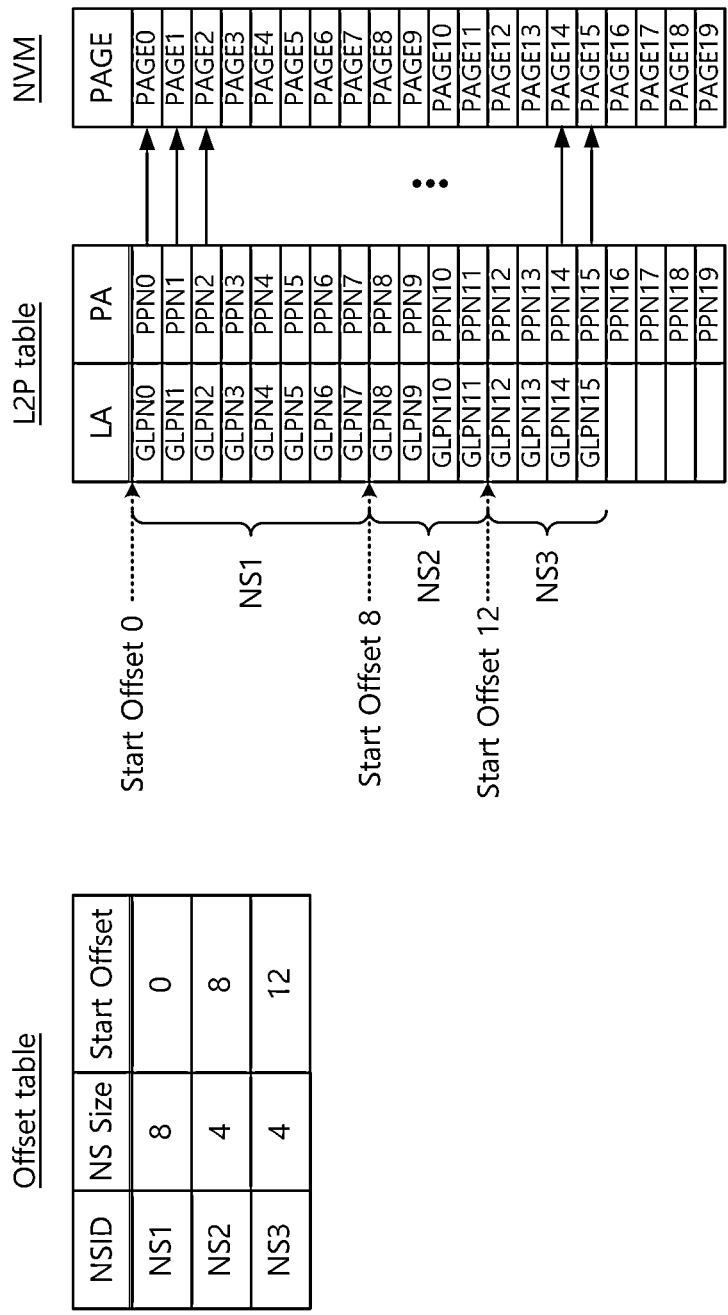
FIGS. 11A to 11E are diagrams illustrating an example of operations of creating and deleting a namespace of the storage device of FIG. 1 supporting a defragmentation operation.

In more detail, referring to FIG. 11A, the storage device 1100 according to some example embodiments may manage mapping information between a logical address space and a physical address space through an offset table and an L2P table. For example, the mapper 1114 may include an offset table and an L2P table.

The offset table may include information on a size and a start offset of each namespace NS. For example, sizes of first to third namespaces NS1 to NS2 are 8, 4, and 4, respectively.

In this case, start offsets of logical address spaces, to which the first to third namespaces NS1 to NS3 are allocated, may be 0, 8, and 12, respectively.

The L2P table may include mapping information between a logical address LA and a physical address PA. For example, the logical address LA managed in the L2P table may be a global logical address GLA, and the global logical address GLA may be contiguous within the storage device 1100. For example, a first logical address space of GLPN0 to GLPN7 may be allocated to the first namespace NS1, a second logical address space of GLPN8 to GLPN11 may be allocated to the second namespace NS2, and a third logical address space of GLPN12 to GLPN15 may be allocated to the third namespace NS3.

Figure 11B:
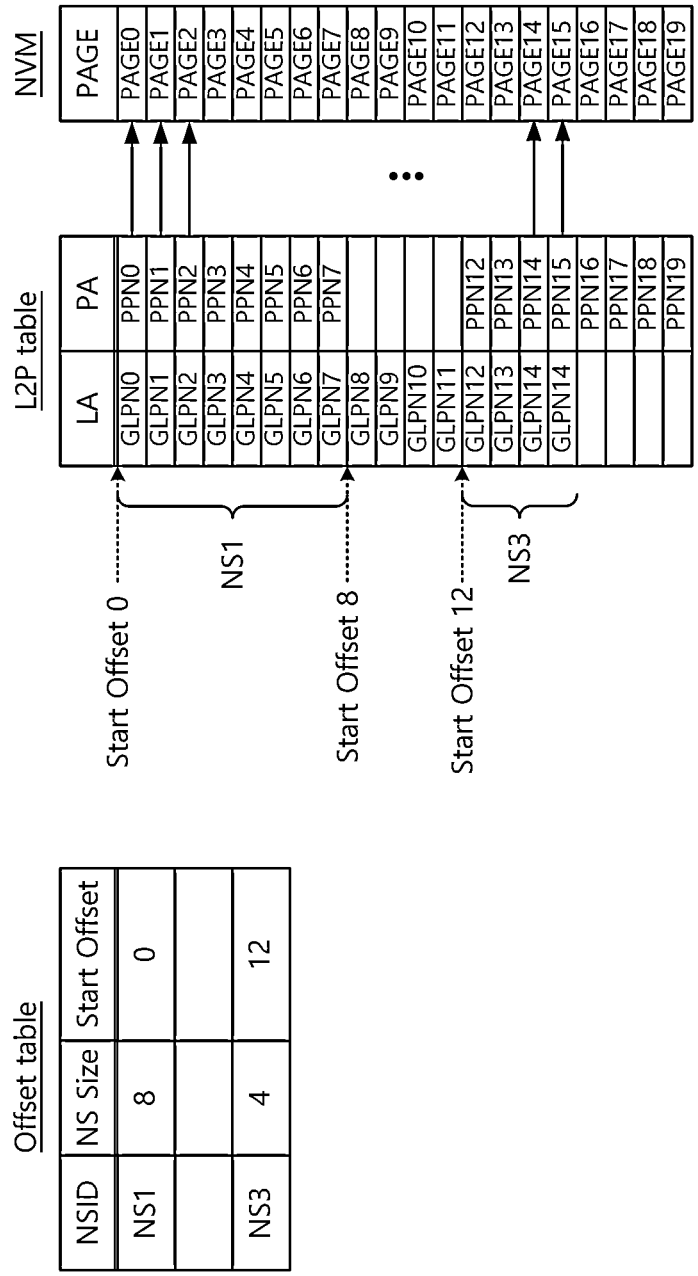

Referring to FIG. 11B, a request of deleting a second namespace NS2 may be received. In this case, in an offset table and an L2P table, mapping information on the second namespace NS2 may be deleted. In addition, although not illustrated, data stored in a physical address space (for example, PAGE8 to PAGE11) corresponding to the deleted second namespace NS2 may be separately managed as valid data. Alternatively, according to example embodiments, an erase operation may be performed on the physical address space (for example, PAGE8 to PAGE11) corresponding to the deleted second namespace NS2.

Figure 11C:
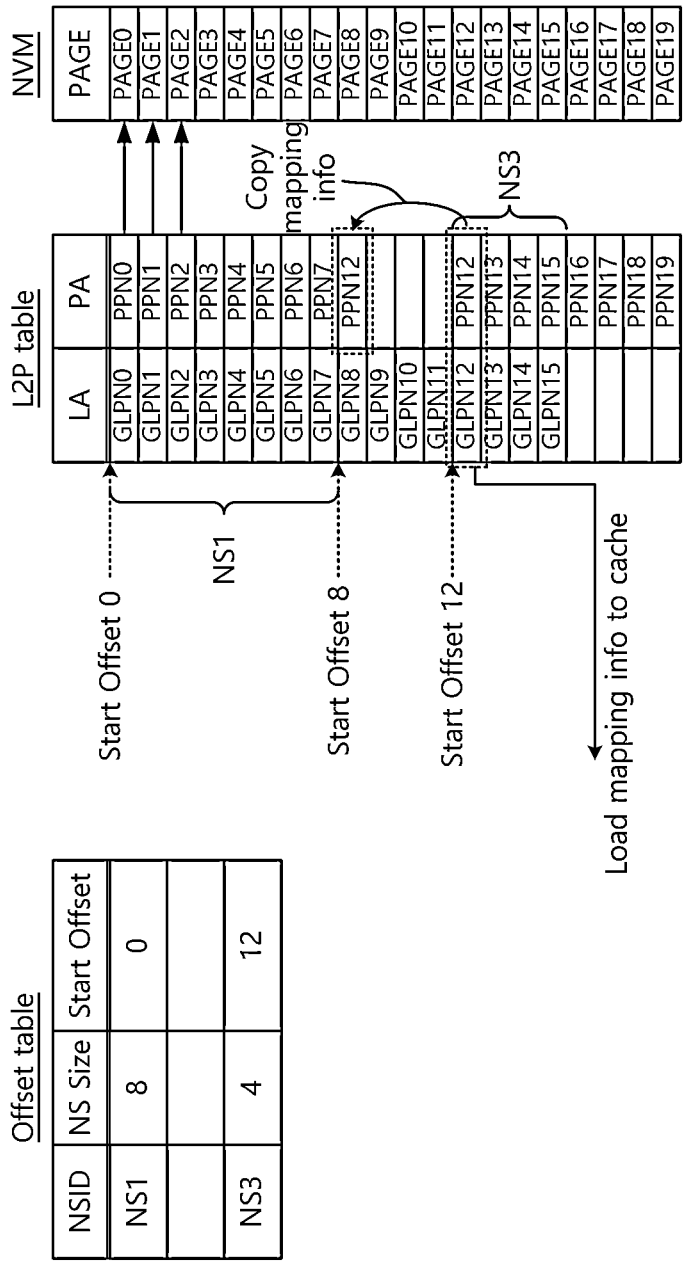

Referring to FIG. 11C, mapping information on a third namespace NS3, on which a defragmentation operation is to be performed, may be loaded into the cache 1112. The mapping information loaded into the cache 1112 may be used to process a request received from the host 1200 during the defragmentation operation.

In addition, the mapping information on the third namespace NS3 may be copied to an empty second logical address space (for example, GLPN8 to GLPN11). For example, mapping information stored in a third logical address (GLPN12 to GLPN15) of the third namespace NS3 may be sequentially copied to the empty second logical address space (for example, GLPN8 to GLPN11).

Figure 11D:
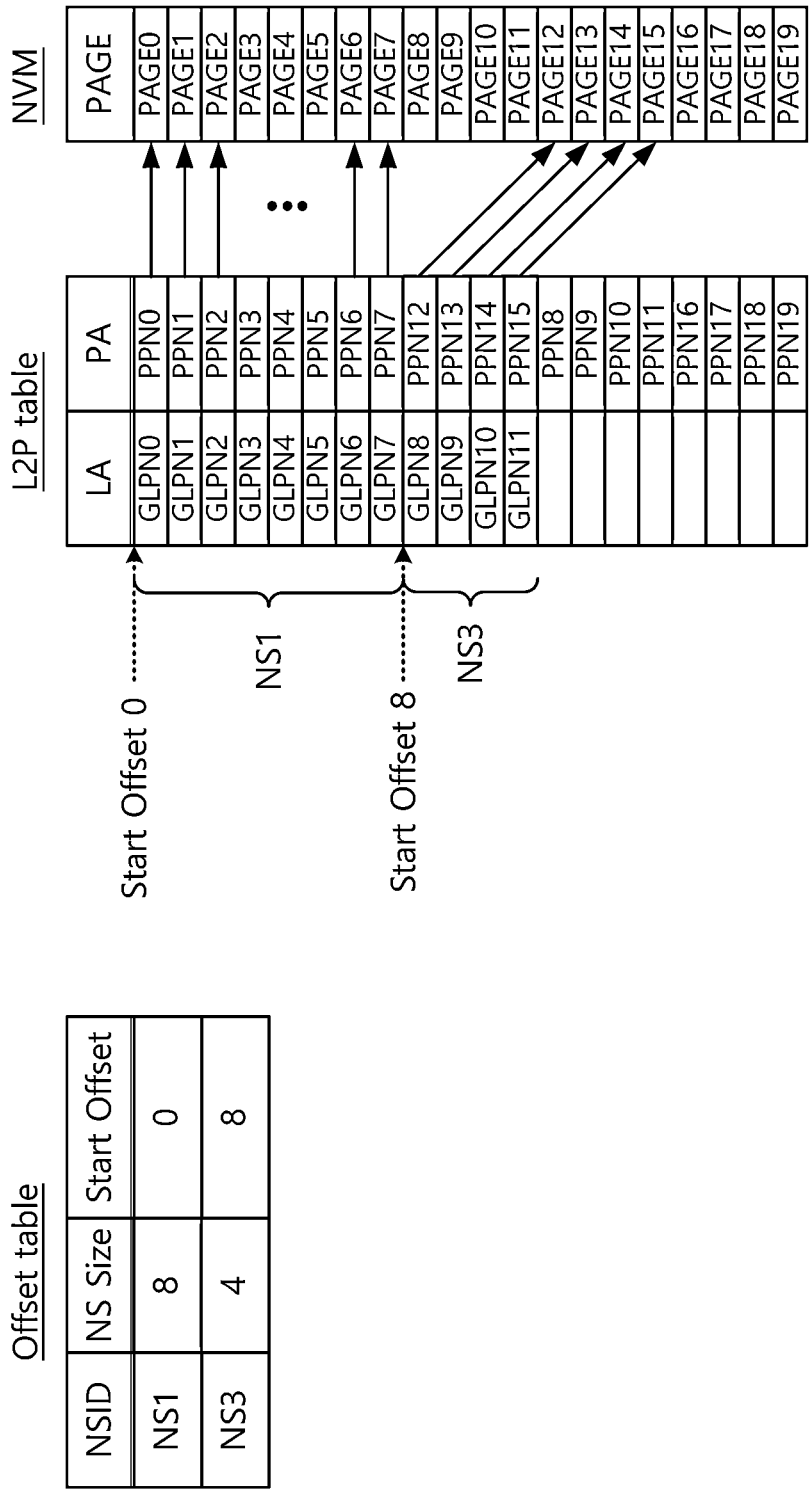

FIG. 11D illustrates a state in which copying mapping information on a third namespace NS3 to a second logical address space (for example, GLPN8 to GLPN11) is completed. In this case, in an L2P table, a logical address space (for example, GLPN0 to GLPN7) of a first namespace and a logical address space (GLPN8 to GLPN11) of the third namespace NS3 may be contiguous to each other. After the copy operation is completed, the third namespace NS3 may be unmapped from an existing third logical address space (for example, GLPN12 to GLPN15).

In addition, in an offset table, mapping information on the first namespace NS1 and mapping information on the second namespace NS2 may be updated to be contiguous to each other. For example, a start offset of the third namespace NS3 may change from '12' to '8.'

Figure 11E:
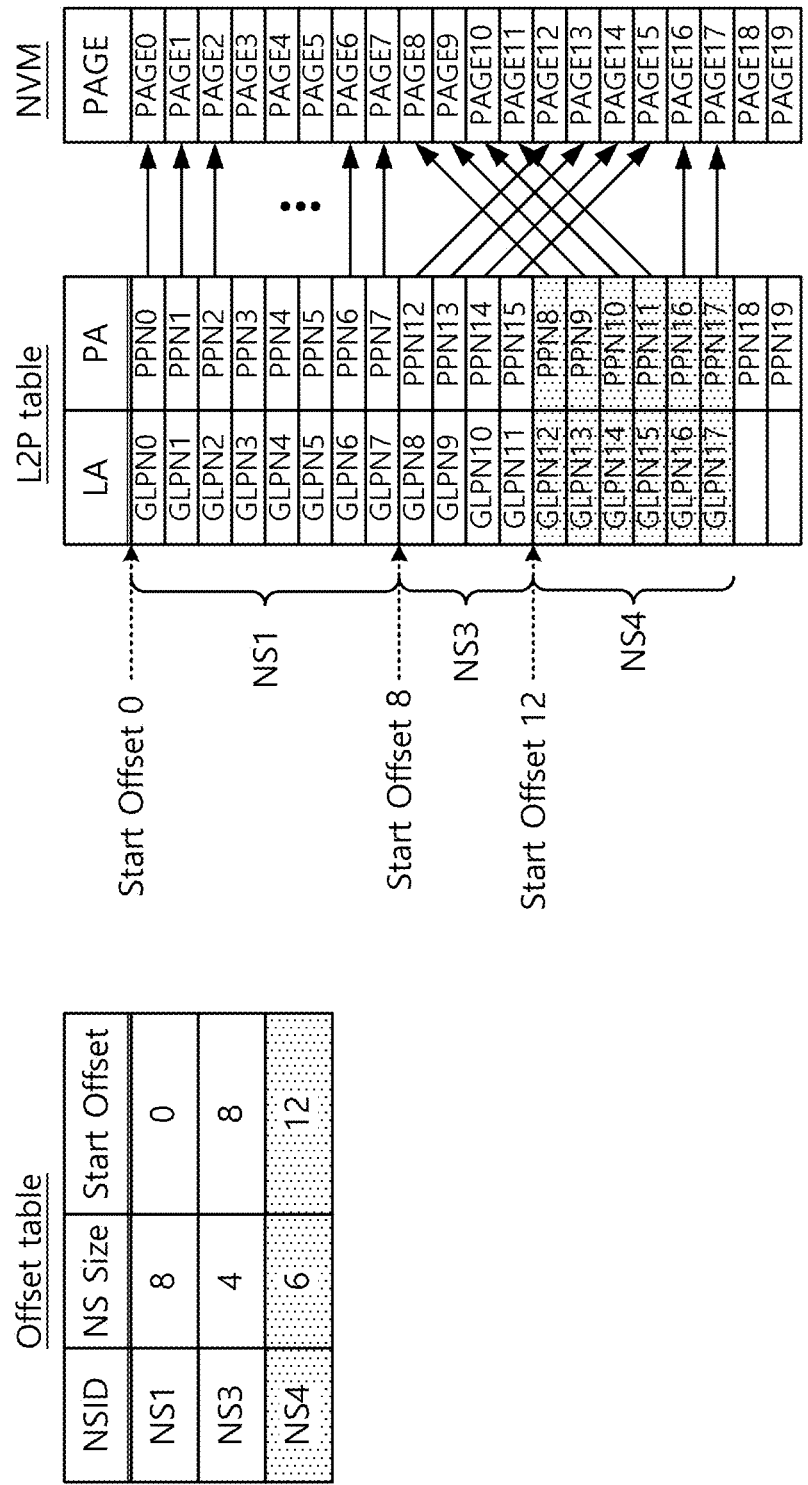

Referring to FIG. 11E, a request of creating a fourth namespace NS4 may be received. In this case, a logical address space contiguous to the logical address space (GLPN8 to GLPN11) of the third namespace NS3 may be allocated to the fourth namespace NS4. For example, when a size of the fourth namespace NS4 is '6,' a logical address space (for example, GLPN12 to GLPN17) corresponding to the size '6' may be allocated to the fourth namespace NS4. As a result, contiguity of logical address spaces between the namespaces NS1 to NS3 may be continuously maintained.

Referring to FIGS. 10A to 10C and 11A to 11E, the storage device 1100 according to some example embodiments may support a defragmentation operation. In this case, the offset table and the L2P table managed by the storage device 1100 may be simpler than the SEG table and the L2D2P table managed by the storage device of FIG. 10, and thus the amount of managed mapping information may be reduced.

Furthermore, the storage device 1100 according to some example embodiments may identify a physical address PA of a page, in which data is stored, with a size and offset information of each namespace NS. Therefore, the storage device 1100 according to some example embodiments may rapidly access a requested page, as compared with the storage device of FIG. 10.

FIG. 12 is a flowchart illustrating a read operation of the storage device 1100 of FIG. 1 according to some example embodiments.

In operation S310, a read request for a predetermined (or, alternatively, desired, selected, or generated) namespace NS may be received from the host 1200.

In operation S320, a determination may be made as to whether a defragmentation operation on the read-requested namespace NS is in progress.

When the defragmentation operation on the read-requested namespace NS is not in progress, the flow may proceed to operation S330. In operation S330, the storage device 1100 may perform a read operation using mapping information stored in the mapper 1114.

When the defragmentation operation on the read-requested namespace NS is in progress, the flow may proceed to operation S340. In operation S340, the storage device 1100 may perform a read operation using mapping information loaded into the cache 1112.

FIG. 13 is a diagram illustrating an example in which the read operation is performed using mapping information loaded into the cache 1112 according to some example embodiments. For ease of description, in FIG. 13, it will be assumed that a read request for the third namespace NS3, on which a defragmentation operation is in progress, is received.

Similarly to FIG. 11C, it will be assumed that a size of the third namespace NS3 is 4 and a start offset of the third namespace NS3 is 12.

Referring to FIG. 13, the read request for the third namespace NS3 may be received from the host 1200. In this case, an offset corresponding to read-requested data may be '13.'

In this case, since a defragmentation operation on the third namespace NS3 is in progress, the storage device 1100 may refer to the mapping information stored in the cache 1112. Since the offset corresponding to the read-requested data is '13,' the storage device 1100 may read data stored in a thirteenth page PAGE13 corresponding to GLPN13 and may transmit the read data to the host 1200.

As described above, the storage device 1100 according to some example embodiments may rapidly process a read request, received during a defragmentation operation, using mapping information stored in the cache 1112.

FIG. 14 is a flowchart illustrating a write operation of the storage device 1100 of FIG. 1 according to some example embodiments.

In operation S410, a write request for a predetermined (or, alternatively, desired, selected, or generated) namespace NS may be received from the host 1200.

In operation S420, a determination may be made as to whether a defragmentation operation on the write-requested namespace NS is in progress.

When the defragmentation operation on the write-requested namespace NS is not in progress, the flow may proceed to operation S430. In operation S430, the storage device 1100 may perform a write operation using mapping information stored in the mapper 1114.

When the defragmentation operation on the write-requested namespace NS is in progress, the flow may proceed to operation S440.

In operation S440, the storage device 1100 may perform a write operation using mapping information loaded into the cache 1112. When the defragmentation operation is then completed, in operation S450, the storage device 1100 may update the mapping information of the mapper 1114 using the mapping information stored in the cache 1112.

Figure 16:
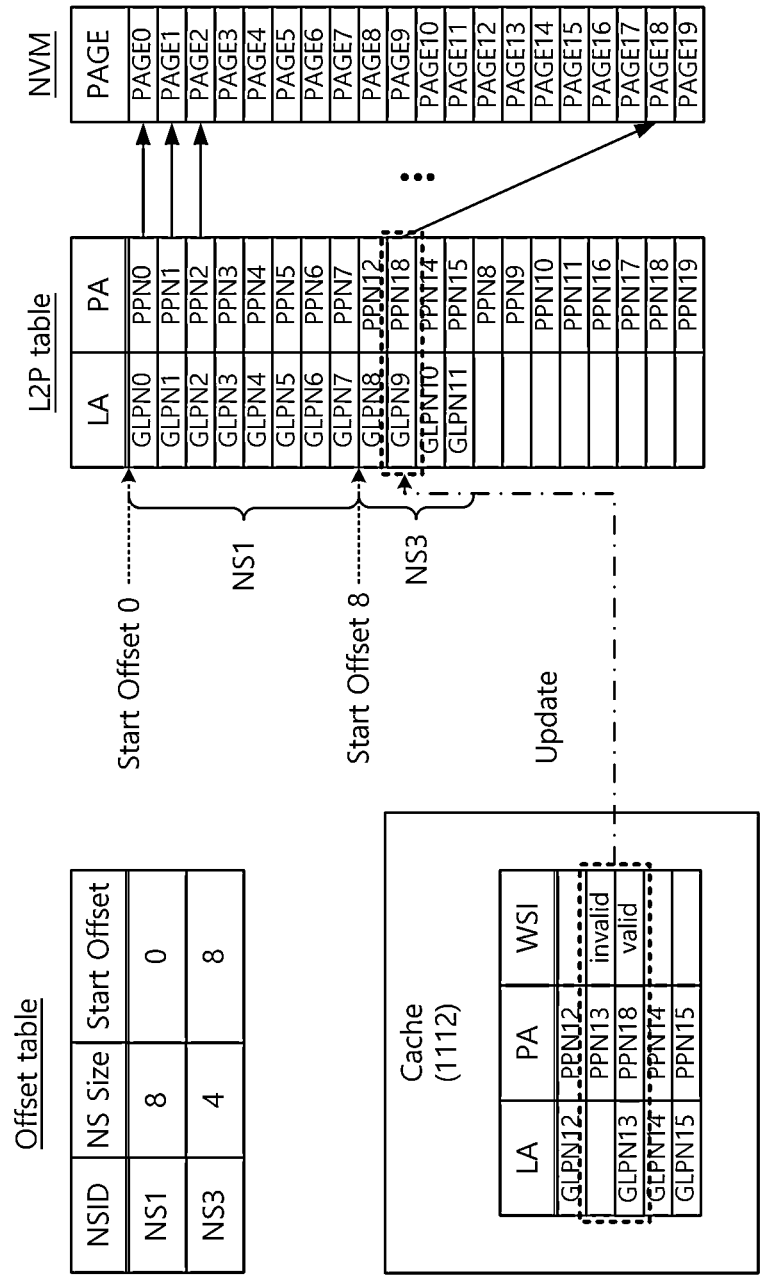
FIG. 16 is a diagram illustrating an example in which mapping information of a mapper is updated using mapping information stored in a cache after the defragmentation operation is completed according to some example embodiments.

FIG. 15 is a diagram illustrating an example in which the write operation is performed using the mapping information loaded into the cache 1112 according to some example embodiments. FIG. 16 is a diagram illustrating an example in which the mapping information of the mapper 1114 is updated using the mapping information stored in the cache 1112 after the defragmentation operation is completed according to some example embodiments. For ease of description, in FIGS. 15 and 16, it will be assumed that a write request for the third namespace NS3, on which a defragmentation operation is in progress, is received. Similarly to FIG. 11C, it will be assumed that a size of the third namespace NS3, on which the defragmentation operation is in progress, is '4,' and a start offset thereof is '12.'

Referring to FIG. 15, the write request for the third namespace NS3 may be received from the host 1200. For example, an offset corresponding to write-requested data may be '13.'

In this case, since the defragmentation operation on the third namespace NS3 is in progress, the storage device 1100 may refer to mapping information stored in the cache 1112. Since the offset corresponding to the write-requested data is '13,' the storage device 1100 may access GLPN13.

Since existing stored data is present in PPN13 mapped to GLPN13, the storage device 1100 may invalidate data previously stored in the page PAGE13 corresponding to PPN13. For example, the storage device 1100 may mark write state information WSI of PPN13 as 'invalid.'

In addition, the storage device 1100 may store the write-requested data in a single page, among empty pages, and may update mapping information. For example, the storage device 1100 may store the write-requested data in an eighteenth page PAGE18 and may update a physical address PA corresponding to GLPN13 to PPN18. In this case, the storage device 1100 may mark write state information WSI on PPN18 as 'valid.'

Referring to FIG. 16, after the defragmentation operation is completed, the storage device 1100 may update an L2P table, stored in the mapper 1114, using mapping information stored in the cache 1112.

For example, mapping information of a second logical address space, among logical address spaces of the third namespace NS3, changes from 'PPN13' to 'PPN18', so that the storage device 1100 may update mapping information corresponding to the L2P table. For example, the storage device 1100 may update mapping information of a logical address space corresponding to an offset '9' from 'PPN13' to 'PPN18' in the L2P table.

In the above example embodiments, the cache 1112 may manage both an invalidated conventional physical address (for example, PPN13) and a new physical address (for example, PPN18). However, this is in some example embodiments, and example embodiments are not limited thereto. According to example embodiments, the cache 1112 may not separately manage the conventional physical address (for example, PPN13) and may manage only the new physical address (for example, PPN18). For example, write state information on GLPN13 and PPN18 corresponding to GLPN13 may be masked with a 'dirty bit.' In this case, while the L2P table stored in the mapper 1114 is updated using mapping information stored in a map cache 1112, the storage device 1100 may identify the invalidated conventional physical address (for example, PPN13) and may invalidate the identified physical address.

As described above, the storage device 1100 according to some example embodiments may rapidly process the write request, received during the defragmentation operation, using the mapping information stored in the cache 1112. In addition, after the defragmentation operation is performed, mapping information of the mapper 1114 maybe updated using mapping information stored in the cache 1112, and thus that the mapping information stored in the cache 1112 may be deleted without being no longer retained.

As described above, according to example embodiments, a storage device may support a multi-namespace function for rapidly responding to a request of a host while improving storage efficiency. As described above, there may be an effect of improving storage space, thereby allowing greater storage in the same space, improved reliability of read/write operations, etc. (such as faster operation completion timing), improved power performance, improved processing performance based on the easier access to memory, as well as an effect of reducing device size or allowing greater memory usage.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While example embodiments have been shown and described above, it will be apparent to those skilled in the art that modifications and variations could be made without departing from the scope of the present inventive concepts as defined by the appended claims.

What is claimed is:

1. A method of operating a storage device managing multi-namespaces, the method comprising:
    deleting mapping information on a first namespace requested to be deleted from a first logical address space;
    loading mapping information on a second namespace, corresponding to a second logical address space contiguous to the first logical address space, into a cache;

copying mapping information on the second namespace from the second logical address space to the first logical address space;

deleting the mapping information on the second namespace from the second logical address space; and performing a requested write or read operation based on mapping information on the second namespace loaded into the cache based on there being a request for access to the second namespace before the copying the mapping information on the second namespace from the second logical address space to the first logical address space is completed.

2. The method of claim 1, wherein
the performing the requested write or read operation based on the mapping information on the second namespace loaded into the cache comprises:
receiving a write request and write data for the second namespace;
identifying whether the copying the mapping information on the second namespace from the second logical address space to the first logical address space is completed; and
writing the write data in a nonvolatile memory based on the mapping information on the second namespace loaded into the cache based on the copying the mapping information on the second namespace from the second logical address space to the first logical address space not being completed.

3. The method of claim 2, wherein
the performing the requested write or read operation based on the mapping information on the second namespace loaded into the cache further comprises:
invalidating a physical address corresponding to the write data stored in the cache based on the mapping information on the second namespace, loaded into the cache, matching a logical address of the write; and
remapping a physical address of the nonvolatile memory, in which the write data is written, to the logical address of the write data.

4. The method of claim 3, wherein
the mapping information on the second namespace stored in the first logical address space is updated using mapping information of the remapped write data stored in the cache after the copying the mapping information on the second namespace from the second logical address space to the first logical address space is completed.

5. The method of claim 2, wherein
the performing the requested write or read operation based on the mapping information on the second namespace loaded into the cache comprises:
receiving a read request for the second namespace;
identifying whether the copying the mapping information on the second namespace from the second logical address space to the first logical address space is completed; and
performing a read operation corresponding to the read request based on the mapping information on the second namespace loaded into the cache based on the copying the mapping information on the second namespace from the second logical address space to the first logical address space not being completed.

6. A storage device comprising:
a nonvolatile memory; and
a controller configured to manage data, stored in the nonvolatile memory, through namespaces,
wherein the controller comprises
a meta manager configured to manage mapping information between a logical address and a physical address of each of the namespaces;
a memory configured to store mapping information on each of the namespaces; and
a cache configured to
load mapping information on a second namespace having a logical address space, contiguous to a first namespace requested to be deleted, among the namespaces, and
store the loaded mapping information on the second namespace, and
the meta manager is configured to perform a write or read operation based on the mapping information on the second namespace stored in the cache based on a request for access to the second namespace being received while a defragmentation operation is performed.

7. The storage device of claim 6, wherein
the first namespace is allocated to a first logical address space,
the second namespace is allocated to a second logical address space, contiguous to the first logical address space, and
the meta manager is configured to
delete mapping information on the first namespace from the first logical address space and
load the mapping information on the second namespace based on the first namespace being requested to be deleted.

8. The storage device of claim 7, wherein
the meta manager is configured to load the mapping information on the second namespace into the cache, and then move the mapping information on the second namespace from the second logical address space to the first logical address space.

9. The storage device of claim 6, wherein
the meta manager is configured to perform a write operation based on the mapping information on the second namespace loaded into the cache based on a write request for the second namespace being received while the defragmentation operation is performed.

10. The storage device of claim 9, wherein
the meta manager is configured to invalidate a physical address corresponding to write data in the cache based on the mapping information on the second namespace, loaded into the cache, matching a logical address of the write data requested to be written.

11. The storage device of claim 10, wherein
the meta manager is configured to remap a physical address of the nonvolatile memory, in which the write data is written, to the logical address of the write data in the cache.

12. The storage device of claim 11, wherein
the meta manager is configured to update mapping information, stored in the nonvolatile memory, using mapping information of the write data remapped to the cache after the defragmentation operation is completed.

13. The storage device of claim 12, wherein
the meta manager is configured to delete mapping information, stored in the cache, after the mapping information, stored in the nonvolatile memory, is updated.

14. The storage device of claim 6, wherein
the meta manager is configured to perform a read operation based on the mapping information on the second namespace loaded into the cache based on a read request for the second namespace being received while the defragmentation operation is performed.

15. The storage device of claim 6, wherein the meta manager is configured to manage mapping information based on a size and an offset of each of the namespaces.

16. The storage device of claim 6, wherein a mapper comprises an L2P table configured to translate logical addresses of the namespaces into the physical addresses.

17. The storage device of claim 16, wherein the logical addresses, managed in the L2P table, have addresses contiguous to each other.

18. A storage system comprising:
at least one host; and
a storage device configured to dynamically create a plurality of namespaces in response to a namespace creation request of the at least one host,
wherein
the storage device comprises
   a nonvolatile memory; and
   a controller configured to manage data, stored in the nonvolatile memory, through the plurality of namespaces,
the plurality of namespaces comprise
   a first namespace allocated to a first logical address space; and
   a second namespace allocated to a second logical address space, contiguous to the first logical address space, and
the controller is configured to
   delete the first namespace in the first logical address space in response to a request of deleting the first namespace,
   copy mapping information on the second namespace from the second logical address space to the first logical address space, and
   load the mapping information on the second namespace into a cache.

19. The storage system of claim 18, wherein the controller is configured to perform a write operation or a read operation based on the mapping information on the second namespace stored in the cache in response to a request for access to the second namespace being received while an operation of copying the mapping information on the second namespace from the second logical address space to the first logical address space is performed.

20. The storage system of claim 19, wherein the controller is configured to
   invalidate a physical address, corresponding to write data requested to be written, in the cache and
   remap a physical address of the nonvolatile memory, in which the write data is to be written, to a logical address of the write data based on the mapping information on the second namespace, loaded into the cache, matching the logical address of the write data.

* * * * *